US011532216B2

(12) United States Patent
Houle et al.

(10) Patent No.: US 11,532,216 B2
(45) Date of Patent: Dec. 20, 2022

(54) COLLAPSIBLE WARNING DEVICE AND METHOD FOR EMITTING A LIGHT SIGNAL

(71) Applicant: SIGNALISATION D'URGENCE RH INC., Sainte-Catherine-de-la-Jacques-Cartier (CA)

(72) Inventors: Raymond Houle, Sainte-Catherine-de-la-Jacques-Cartier (CA); Gérald Juneau, Sainte-Catherine-de-la-Jacques-Cartier (CA); David Mitchell, Stanstead (CA)

(73) Assignee: SIGNALISATION D'URGENCE RH INC., Sainte-Catherine-de-la-Jacques-Cartier (CA)

( * ) Notice: Subject to any disclaimer, the term of this patent is extended or adjusted under 35 U.S.C. 154(b) by 731 days.

(21) Appl. No.: 16/554,443

(22) Filed: Aug. 28, 2019

(65) Prior Publication Data

US 2020/0082680 A1    Mar. 12, 2020

Related U.S. Application Data

(60) Provisional application No. 62/728,132, filed on Sep. 7, 2018.

(51) Int. Cl.
*G08B 5/00*    (2006.01)
*G08B 5/36*    (2006.01)
(Continued)

(52) U.S. Cl.
CPC .............. *G08B 5/006* (2013.01); *B60Q 7/00* (2013.01); *E01F 9/654* (2016.02); *E01F 9/688* (2016.02); *G08B 5/24* (2013.01); *G08B 5/36* (2013.01)

(58) Field of Classification Search
CPC . G08B 5/006; G08B 5/24; G08B 5/36; B60Q 7/00; E01F 9/654; E01F 9/688
See application file for complete search history.

(56) References Cited

U.S. PATENT DOCUMENTS

| 2,669,705 A | * | 2/1954 | Collins | ..................... B60Q 7/00 340/908 |
| 3,239,176 A | * | 3/1966 | Johnson | ................. G01C 15/06 248/528 |

(Continued)

FOREIGN PATENT DOCUMENTS

| CA | 2386836 A1 | 4/2001 |
| CA | 2340157 C  | 1/2006 |

(Continued)

*Primary Examiner* — Nimeshkumar D Patel
*Assistant Examiner* — Tania Courson
(74) *Attorney, Agent, or Firm* — Snell & Wilmer L.L.P.

(57) ABSTRACT

The present disclosure concerns a warning device comprising a warning body having a longitudinal axis and comprising a light-emitting assembly; and a collapsible stand configurable in a compacted configuration and in a warning configuration in which the light-emitting assembly is at least partially visible. The collapsible stand comprises a handle sleeve mounted to and slidable along the warning body and legs pivotably mounted to the handle sleeve, the legs being juxtaposed against the warning body when the collapsible stand is in the compacted configuration to cover the warning body and the legs extending outwardly and downwardly when the collapsible stand is in the warning configuration, the collapsible stand being configurable between the compacted configuration and the warning configuration by sliding the handle sleeve along the warning body. The disclosure also concerns a warning assembly comprising such a warning device and a method of emitting a warning light signal.

20 Claims, 16 Drawing Sheets

(51) Int. Cl.
*E01F 9/688* (2016.01)
*E01F 9/654* (2016.01)
*G08B 5/24* (2006.01)
*B60Q 7/00* (2006.01)

(56) References Cited

U.S. PATENT DOCUMENTS

| | | | |
|---|---|---|---|
| 5,122,781 A * | 6/1992 | Saubolle | B60Q 7/00 |
| | | | 116/63 P |
| 5,319,365 A * | 6/1994 | Hillinger | B60Q 7/00 |
| | | | 340/331 |
| 5,630,660 A * | 5/1997 | Chen | F21V 21/22 |
| | | | 362/183 |
| 6,035,567 A * | 3/2000 | Cameron | G09F 15/0037 |
| | | | 116/63 P |
| 6,050,531 A | 4/2000 | Wilcox | |
| 6,092,770 A | 7/2000 | Battocchio | |
| 6,213,436 B1 | 4/2001 | Hembree | |
| 6,247,673 B1 | 6/2001 | Bees | |
| 6,265,969 B1 * | 7/2001 | Shih | B60Q 7/00 |
| | | | 340/489 |
| 6,389,721 B1 * | 5/2002 | Yang | G09F 15/0062 |
| | | | 116/63 T |
| 6,407,335 B1 | 6/2002 | Franklin-Lees et al. | |
| 6,536,723 B1 | 3/2003 | Nakatani | |
| 6,688,565 B1 | 2/2004 | Chen | |
| 6,808,151 B1 | 10/2004 | McLaughlin et al. | |
| 6,839,001 B1 * | 1/2005 | Bonin | B60Q 7/00 |
| | | | 116/63 P |
| 6,892,594 B2 | 5/2005 | Buck et al. | |
| 6,931,740 B2 | 8/2005 | Marshall et al. | |
| 6,942,187 B2 | 9/2005 | Blackburn | |
| 6,947,666 B2 | 9/2005 | Chapman et al. | |
| 7,073,926 B1 | 7/2006 | Kremers et al. | |
| 7,104,512 B2 | 9/2006 | Wolf et al. | |
| 7,111,424 B1 | 9/2006 | Moody et al. | |
| 7,186,007 B1 | 3/2007 | Rotwitt | |
| 7,207,118 B2 | 4/2007 | Watters | |
| 7,217,061 B2 | 5/2007 | Stratton | |
| 7,229,061 B2 | 6/2007 | Baettig et al. | |
| 7,296,909 B2 | 11/2007 | Van Deursen et al. | |
| 7,344,320 B2 | 3/2008 | Barker | |
| 7,441,339 B2 | 10/2008 | Kallabis | |
| 7,575,207 B2 | 8/2009 | Chuang | |
| 7,624,958 B2 | 12/2009 | Ropertz et al. | |
| 7,626,634 B2 | 12/2009 | Ohki et al. | |
| 7,780,126 B2 | 8/2010 | Law et al. | |
| 7,789,356 B1 | 9/2010 | Jones | |
| 7,798,452 B1 | 9/2010 | Wessels et al. | |
| 7,997,753 B2 | 8/2011 | Walesa | |
| 8,070,026 B2 | 12/2011 | Marteaux et al. | |
| 8,100,538 B2 | 1/2012 | Kuroda | |
| 8,127,695 B2 | 3/2012 | Macdonald et al. | |
| 8,251,536 B2 | 8/2012 | Bevirt | |
| 8,262,248 B2 | 9/2012 | Wessel | |
| 8,322,665 B2 | 12/2012 | Palik et al. | |
| 8,429,841 B1 | 4/2013 | Keller Butch et al. | |
| 8,505,867 B2 | 8/2013 | Conrad | |
| 8,534,620 B2 | 9/2013 | Zierer et al. | |
| 8,590,190 B2 | 11/2013 | White | |
| 8,701,900 B2 | 4/2014 | Childers et al. | |
| 8,714,426 B2 | 5/2014 | Bohurjak et al. | |
| 8,714,498 B2 | 5/2014 | Ortega | |
| 8,801,226 B2 | 8/2014 | Moore | |
| 8,823,884 B2 | 9/2014 | Yokawa | |
| 9,039,307 B2 | 5/2015 | Lecuna Aguerrevere | |
| 9,153,149 B1 | 10/2015 | Curtiss | |
| 9,242,600 B2 | 1/2016 | Al Shalabi | |
| 9,242,764 B2 | 1/2016 | Zetterlund | |
| 9,304,285 B2 | 4/2016 | Barbour et al. | |
| 9,323,134 B2 | 4/2016 | Clark | |
| 9,328,942 B1 | 5/2016 | Eide | |
| 9,330,645 B2 | 5/2016 | Shawhney et al. | |
| 9,417,508 B2 | 8/2016 | Yang | |
| 9,430,943 B2 | 8/2016 | Mcdowell et al. | |
| 9,718,401 B2 * | 8/2017 | Kim | B60Q 7/00 |
| 9,720,444 B2 | 8/2017 | Holden | |
| 9,745,706 B2 | 8/2017 | Baban et al. | |
| 9,759,368 B1 | 9/2017 | Parks et al. | |
| 9,897,123 B2 | 2/2018 | Esposito et al. | |
| 9,967,920 B2 | 5/2018 | Itoh et al. | |
| 2002/0059893 A1 * | 5/2002 | Kim | B60Q 7/005 |
| | | | 116/63 P |
| 2008/0036584 A1 * | 2/2008 | Lang | F21V 33/00 |
| | | | 340/473 |
| 2008/0064001 A1 | 3/2008 | Dorfman et al. | |
| 2009/0084929 A1 | 4/2009 | Bergmann et al. | |
| 2010/0231161 A1 * | 9/2010 | Brown | H02J 7/0042 |
| | | | 320/101 |
| 2011/0073722 A1 | 3/2011 | Meuret et al. | |
| 2012/0112033 A1 | 5/2012 | Oyen | |
| 2016/0084431 A1 | 3/2016 | Chen et al. | |
| 2017/0261630 A1 | 9/2017 | Olsson et al. | |
| 2017/0299109 A1 | 10/2017 | Mcdonald | |
| 2017/0307133 A1 | 10/2017 | Minn et al. | |
| 2017/0318281 A1 | 11/2017 | Edlund et al. | |
| 2018/0051849 A1 | 2/2018 | Torbitt et al. | |
| 2018/0149344 A1 | 5/2018 | Cornell et al. | |

FOREIGN PATENT DOCUMENTS

| | | |
|---|---|---|
| CA | 2306869 C | 7/2008 |
| CA | 2516823 C | 9/2008 |
| CA | 2682940 A1 | 10/2008 |
| CA | 2716440 C | 2/2014 |
| CA | 2882809 A1 | 3/2014 |
| CA | 2899738 A1 | 8/2014 |
| CA | 2719151 C | 10/2014 |
| CA | 2711389 C | 12/2014 |
| CA | 268119 C | 1/2015 |
| CA | 2933894 A1 | 7/2015 |
| CA | 2936499 A1 | 7/2015 |
| CA | 3006931 A1 | 6/2016 |
| CA | 2850772 C | 9/2017 |
| GB | 2415728 A | 1/2006 |
| KR | 2015103872 A * | 9/2015 |
| WO | WO2017077252 A1 | 5/2017 |
| WO | WO2017096177 A1 | 6/2017 |
| WO | WO2018068186 A1 | 4/2018 |
| WO | WO2018068253 A1 | 4/2018 |

* cited by examiner

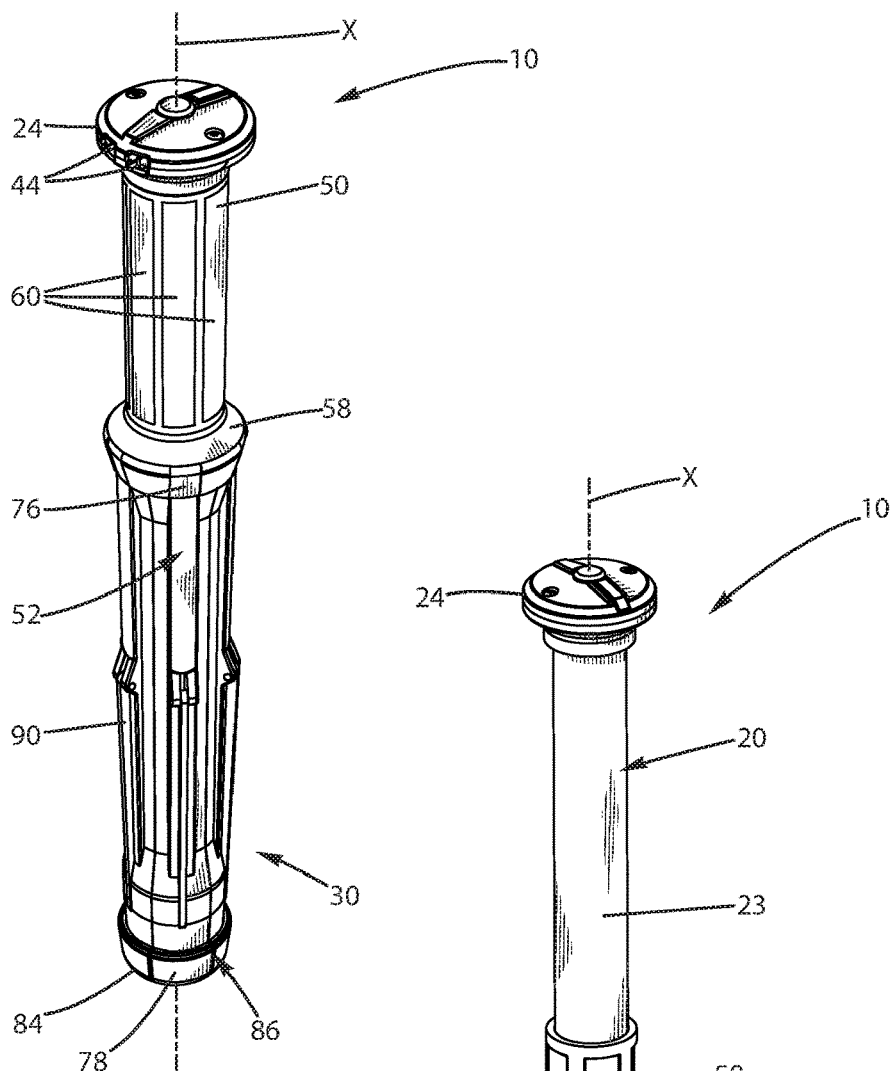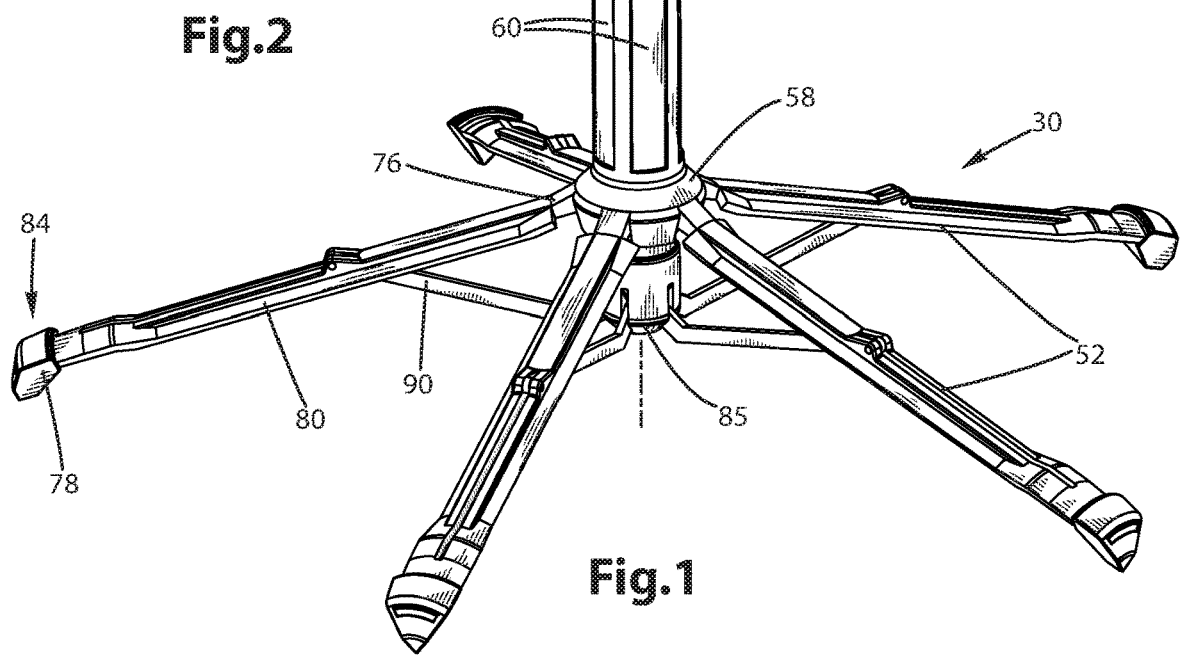
Fig.2
Fig.1

COLLAPSIBLE WARNING DEVICE AND METHOD FOR EMITTING A LIGHT SIGNAL

PRIOR APPLICATION

The present application claims priority from U.S. provisional patent application No. 62/728,132, filed on Sep. 7, 2018, and entitled "COLLAPSIBLE WARNING DEVICE", the disclosure of which being hereby incorporated by reference in its entirety.

TECHNICAL FIELD

The technical field relates to a warning device and more particularly to a warning device configurable in a warning configuration and in a compacted configuration for storage and transport purposes, and to a method of emitting a light signal, such as warning light signal.

BACKGROUND

For safety reasons, every driver should carry a warning device in their vehicle, so as to easily and quickly warn road users, for instance to indicate an accident, an obstacle or any other potential danger or breakdown on a road.

A triangular member with luminescent stripes is conventionally used as a warning device. However, the triangular member might not be properly visible from the other users. Moreover, it might not be easily and stably installed on the ground.

GB 2 415 728 also discloses a warning device comprising a light emitting body and legs pivotally mounted to the body. However, the installation of the warning device might be difficult and require a few minutes, whereas the warning device might not be stably supported on the road.

In view of the above, there is a need for a warning device which would be able to overcome or at least minimize some of the above-discussed prior art concerns.

BRIEF SUMMARY

It is therefore an aim of the present disclosure to address the above-mentioned issues.

According to a general aspect, there is provided a warning device comprising a warning body having a longitudinal axis and comprising a light-emitting assembly; and a collapsible stand comprising a handle sleeve mounted to and slidable along at least a portion of the warning body; and a plurality of legs, each one of the plurality of legs comprising a proximal end pivotably mounted to the handle sleeve; and a distal end configured to move away from the warning body upon sliding the handle sleeve downwardly along the at least a portion of the warning body.

According to another general aspect, there is provided a warning device comprising a warning body having a longitudinal axis and comprising a light-emitting assembly; and a collapsible stand selectively configurable at least into: a compacted configuration; and a warning configuration in which the light-emitting assembly is at least partially visible. The collapsible stand comprises a handle sleeve mounted to and slidable along at least a portion of the warning body; and a plurality of legs pivotably mounted to the handle sleeve, the plurality of legs being juxtaposed against the warning body when the collapsible stand is configured in the compacted configuration to at least partially cover the warning body and the plurality of legs extending outwardly and downwardly from the warning body when the collapsible stand is configured in the warning configuration. The collapsible stand is configurable between the compacted configuration and the warning configuration by sliding the handle sleeve along the at least a portion of the warning body.

According to another general aspect, there is provided a warning assembly comprising at least one warning device according the present disclosure; and a storage box having a housing defining an inner cavity to receive the at least one warning device.

According to another general aspect, there is provided a method of emitting a warning light signal, comprising providing a warning device comprising a light-emitting assembly and a collapsible stand having a handle sleeve mounted to and slidable along at least a portion of the light-emitting assembly and a plurality of legs pivotably mounted to the handle sleeve; sliding the handle sleeve downwardly along the at least a portion of the light-emitting assembly for the plurality of legs to extend outwardly and downwardly from the light-emitting assembly so as to form a warning device stand; and actuating the light-emitting assembly to emit a warning light signal.

According to another general aspect, there is provided a warning device comprising a warning body having a longitudinal axis and comprising a light-emitting assembly, and a collapsible stand. The collapsible stand is configurable in a compacted configuration, and in a warning configuration in which the light-emitting assembly is at least partially visible. The collapsible stand comprises a handle sleeve slidably mounted to the warning body; and a plurality of legs pivotably mounted to the handle sleeve. The plurality of legs are juxtaposed against the warning body when the collapsible stand is configured in the compacted configuration to at least partially cover the warning body. The plurality of legs extend outwardly and downwardly when the collapsible stand is configured in the warning configuration. The collapsible stand is configurable between the compacted configuration and the warning configuration by sliding the handle sleeve along the warning body.

According to another general aspect, there is provided a warning device comprising a warning body having a longitudinal axis and comprising a light-emitting assembly, and a collapsible stand. The collapsible stand comprises a handle sleeve slidably mounted along the warning body and a plurality of legs. Each of the plurality of legs has a proximal end pivotably mounted to the handle sleeve, and a distal end configured to move away from the warning body when the handle sleeve is slid downwardly along the warning body.

According to yet another general aspect, there is provided a warning assembly comprising at least one warning device according to the present disclosure, and a storage box having a housing defining an inner cavity to receive the at least one warning device.

BRIEF DESCRIPTION OF THE DRAWINGS

FIG. 1 is a top perspective view of a warning device in accordance with an embodiment, the warning device including a warning body and a collapsible stand configured in a warning configuration;

FIG. 2 is a top perspective view of the warning device of FIG. 1, wherein the collapsible stand is configured in a compacted configuration;

DETAILED DESCRIPTION

Figure 3:
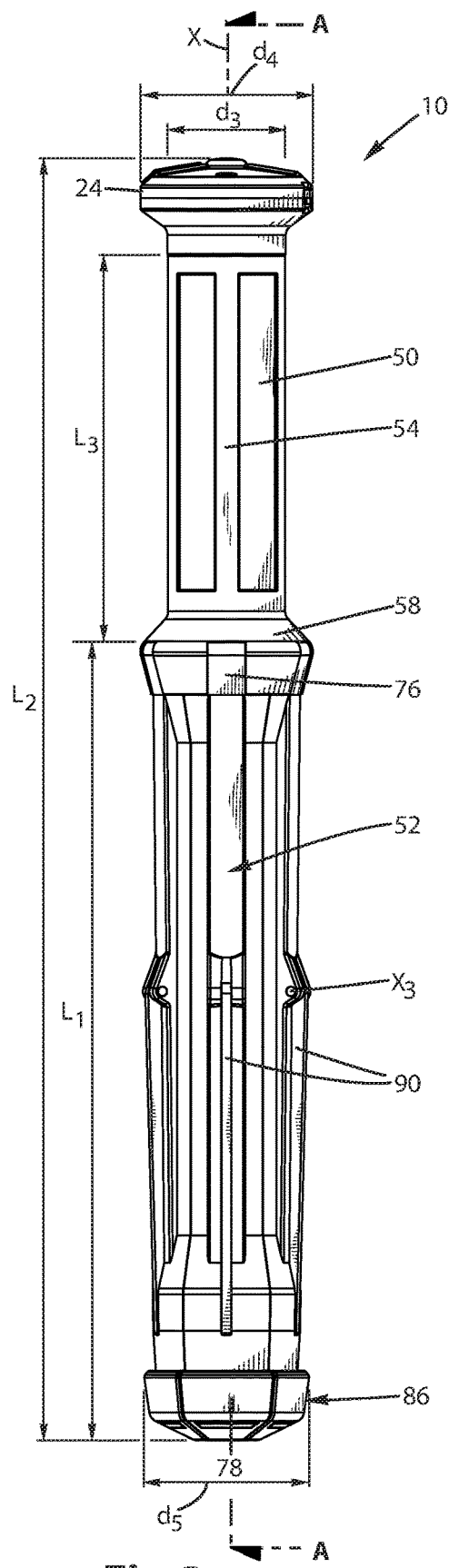
FIG. 3 is a side elevation view of the warning device of FIG. 2.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward" "left", "right" and the like should, unless otherwise indicated, be taken in the context of the figures only and should not be considered limiting. Moreover, the figures are meant to be illustrative of certain characteristics of the warning device and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment," "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring now to the drawings, and more particularly to FIGS. 1 to 10, there is shown a warning device 10 that is configured to be easily, quickly and stably installed so as to warn, for instance and without being limitative, road users of an accident, an obstacle or any other potential danger or breakdown on a road.

Figure 4:
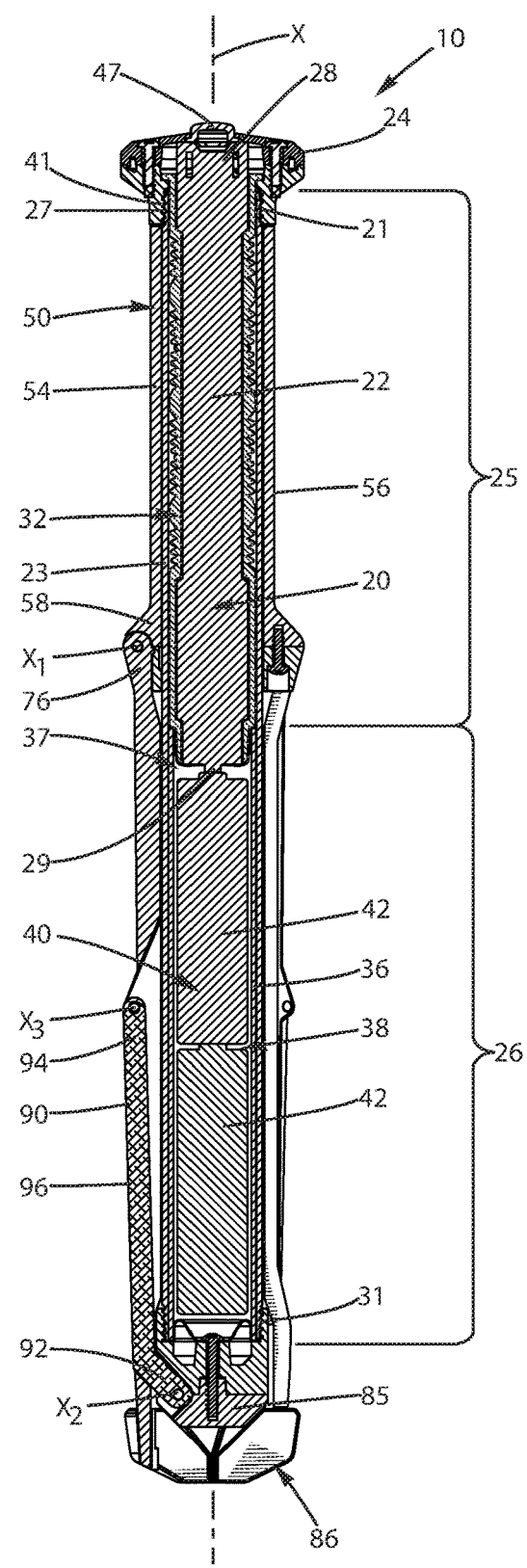
FIG. 4 is a sectional view of the warning device of FIG. 3, taken along cross-section lines A-A of FIG. 3.
Figure 5:
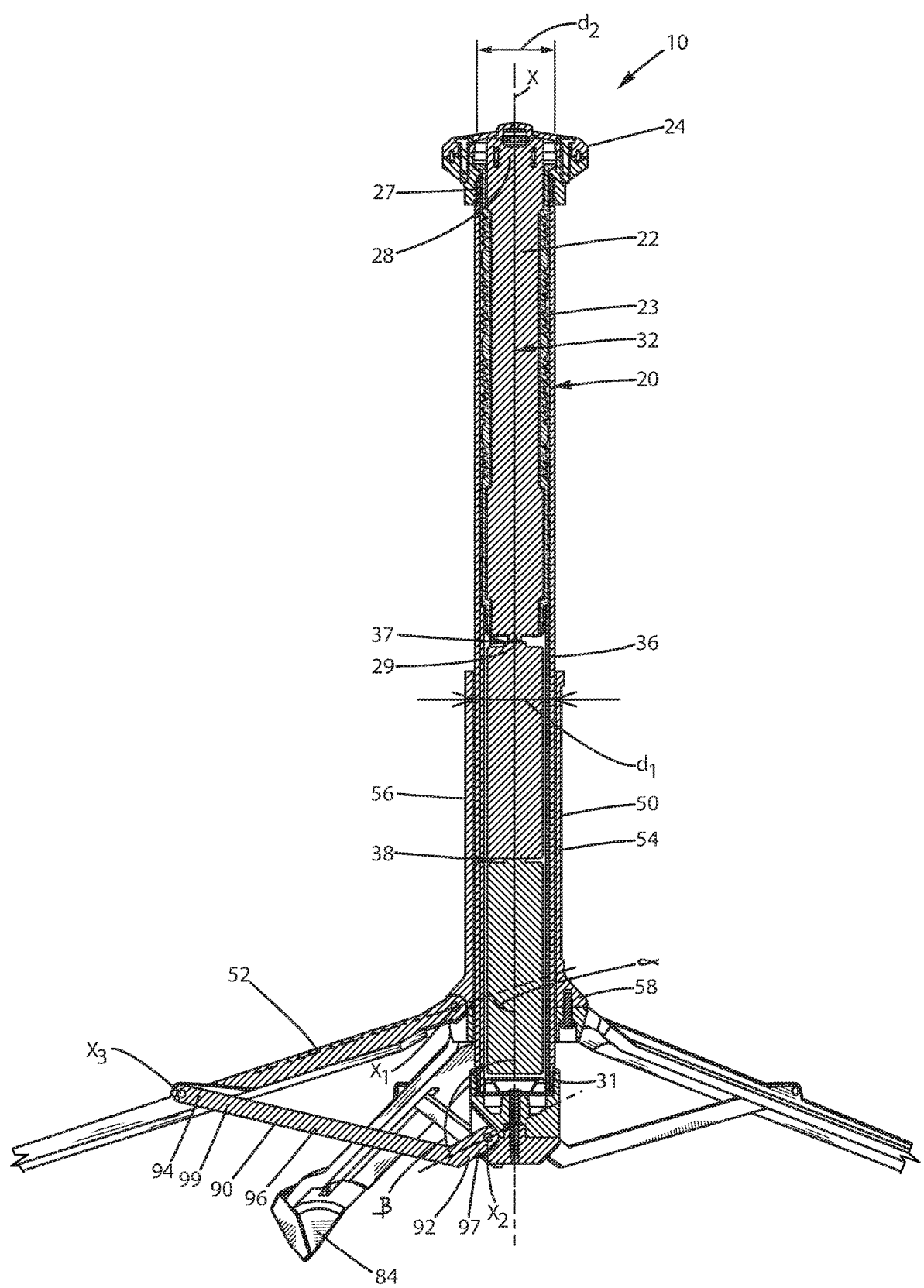
FIG. 5 is a sectional view of the warning device of FIG. 3, wherein the collapsible stand is configured in the warning configuration.

The warning device 10 according to the present disclosure comprises a warning body 20 extending along a longitudinal axis X. The warning body 20 comprises a light-emitting assembly 22, as represented in FIGS. 4 and 5. The warning device 10 further comprises a collapsible stand 30 configurable in a compacted configuration (or storage configuration or transport configuration), as represented for instance in FIG. 2, and in a warning configuration (or usage configuration or deployed configuration), as represented for instance in FIG. 1, in which the light-emitting assembly 22 of the warning body 20 is at least partially visible. The term "visible" should be understood as meaning that a light emitted by the light-emitting assembly 22 could be seen by a user in the vicinity of the warning device 10. In other words, in the warning configuration, the light-emitting assembly 22 is not covered by one or more components of the warning device 10 that would be made in a substantially masking or opaque material. It should further be understood that, in the warning configuration, the light-emitting assembly 22 could, as in the embodiment shown, be at least partially covered by a component of the warning device 10 at least partially made of a substantially translucent material.

The collapsible stand 30 is also configurable into a plurality of intermediate configurations, between the warning configuration and the compacted configuration, as represented for instance in FIGS. 6 and 8 to 10.

Warning Body

As represented in FIG. 4, considered along the longitudinal axis X, the warning body 20 comprises a sleeve 23 (or body sleeve 23), which is substantially cylindrical in shape in the embodiment shown. The body sleeve 23 extends along the longitudinal axis X and has a substantially constant cross-section. The warning body 20 also includes a grabbing portion 24, mounted to an upper end 27 of the sleeve 23, and a lower end cap 85 secured to a lower end 31 of the sleeve 23, as represented in FIG. 4.

In the following description, the terms lower and upper should be understood with reference to the longitudinal axis X of the warning body 20, when the collapsible stand 30 is configured in the warning configuration, the warning body 20 being supported on a substantially horizontal ground, such as a road, so that the warning body 20 (and the longitudinal axis X thereof) extends in a substantially vertical orientation.

As represented in FIG. 4, the sleeve 23 (or body sleeve 23) can be divided along its length into an upper section 25 (or upper portion 25) and a lower section 26 (or lower portion 26). In the embodiment shown, at least the upper section 25 of the sleeve 23 is made of a material having translucent properties, such as translucent glass or plastics. In the following description, the upper and lower sections (or upper and lower portions) of the body sleeve 23 might also be referred to as the upper and lower sections or upper and lower portions of the warning body 20.

The lower section 26 of the body sleeve 23 can also be made of a material having translucent properties. However, in the embodiment shown, it is made of an opaque material.

In the embodiment shown, an outer surface of the sleeve 23 extends continuously between the upper section 25 and the lower section 26. The upper section 25 and the lower section 26 could also be formed of two distinct sleeves secured to each other. For instance, in an embodiment (not shown), each of the upper section 25 and the lower section 26 of the sleeve 23 could comprise a sleeve securable together, for instance removably securable to each other by screws, complementary threads or a ratchet system or being permanently bonded together.

The sleeve 23 of the warning body 20 defines an inner channel 37 (or light-emitting assembly-receiving cavity 37) configured to contain the light-emitting assembly 22 and, more particularly, to contain a light-emitting module 32 and an energy supply 40 of the light-emitting assembly 22.

Referring now to FIG. 4, in the non-limitative embodiment shown, the inner channel 37 contains an inner sleeve 36 in the lower section 26 of the body sleeve 23. In the embodiment shown, the inner sleeve 36 is substantially cylindrical in shape and has an outer cross-section corresponding substantially to an inner cross-section of the body sleeve 23, so that the inner sleeve 36 is snugly fitted into the lower section 26 of the body sleeve 23. The inner sleeve 36 defines an inner cavity 38. In the embodiment shown, the inner cavity 38 is substantially cylindrical in shape also and extends along the longitudinal axis X. The inner cavity 38 of the inner sleeve 36 arranged in the lower section 26 of the body sleeve 23 is configured to contain the energy supply 40 of the light-emitting assembly 22. In the embodiment shown, the energy supply 40 is a battery assembly 40 (for instance a rechargeable battery assembly 40) and comprises two batteries 42 (for instance two rechargeable batteries 42) extending consecutively along the longitudinal axis X in the inner cavity 38 of the inner sleeve 36. It is appreciated that the shape, the configuration, and the location of the energy supply 40, as well as the configuration and the number of the batteries 42 can vary from the embodiment shown.

It is appreciated that the shape and the configuration of the body sleeve 23, as well as the shape and the configuration of its inner channel 37 as well as the shape and the configuration of the inner sleeve 36, can vary from the embodiment shown. It could also be conceived a warning body 20 having no inner sleeve arranged in the lower section of the body sleeve 23 (i.e. a warning body 20 in which the energy supply 40 of the light-emitting assembly 22 would be arranged directly in the inner channel 37 of the body sleeve 23).

Light-Emitting Module

The light-emitting module 32 of the light-emitting assembly 22 is removably inserted into the upper portion 25 of the inner channel 37 defined in the sleeve 23. A non-limitative embodiment of the light-emitting module 32 is shown in FIGS. 11 to 14, wherein the light-emitting assembly 22 has been removed from the body sleeve 23.

The light-emitting module 32 has an upper end 28 and an opposed lower end 29. In the embodiment shown, the upper end 28 of the light-emitting module 32 is substantially horizontally aligned with the upper end 27 of the sleeve 23 when inserted therein, considered along the longitudinal axis X. As described below, the grabbing portion 24 is mounted to the upper end 28 of the light-emitting module 32, as represented in FIG. 4 and is engaged to a portion of the upper end 27 of the body sleeve 23 surrounding at least partially the upper end 28 of the light-emitting module 32.

In the embodiment shown, the light-emitting module 32 comprises a translucent peripheral wall 39, extending at least along an axial section thereof, and a plurality of light sources 33, such as LEDs, housed therein. It is understood that the body sleeve 23, in particular its translucent areas, is arranged with regards to the light-emitting assembly 22 for the lights emitted by the light sources 33 of the light-emitting module 32 to be visible from the outside of the warning body 20 at least when the collapsible stand 30 is configured in the warning configuration. In the embodiment shown, the translucent peripheral wall 39 has an outer surface presenting a substantially serrated profile, designed to contribute to the diffusion of the light emitted by the light sources 33 of the light-emitting assembly 22. In the embodiment shown, the translucent peripheral wall 39 acts as a lens for the light sources 33 contained therein. In some embodiments, the outer surface of the light-emitting module 32 could have a Fresnel surface structure, so as to further improve the diffusion of the lights emitted by the light sources 33 of the light-emitting module 32.

Figure 7:
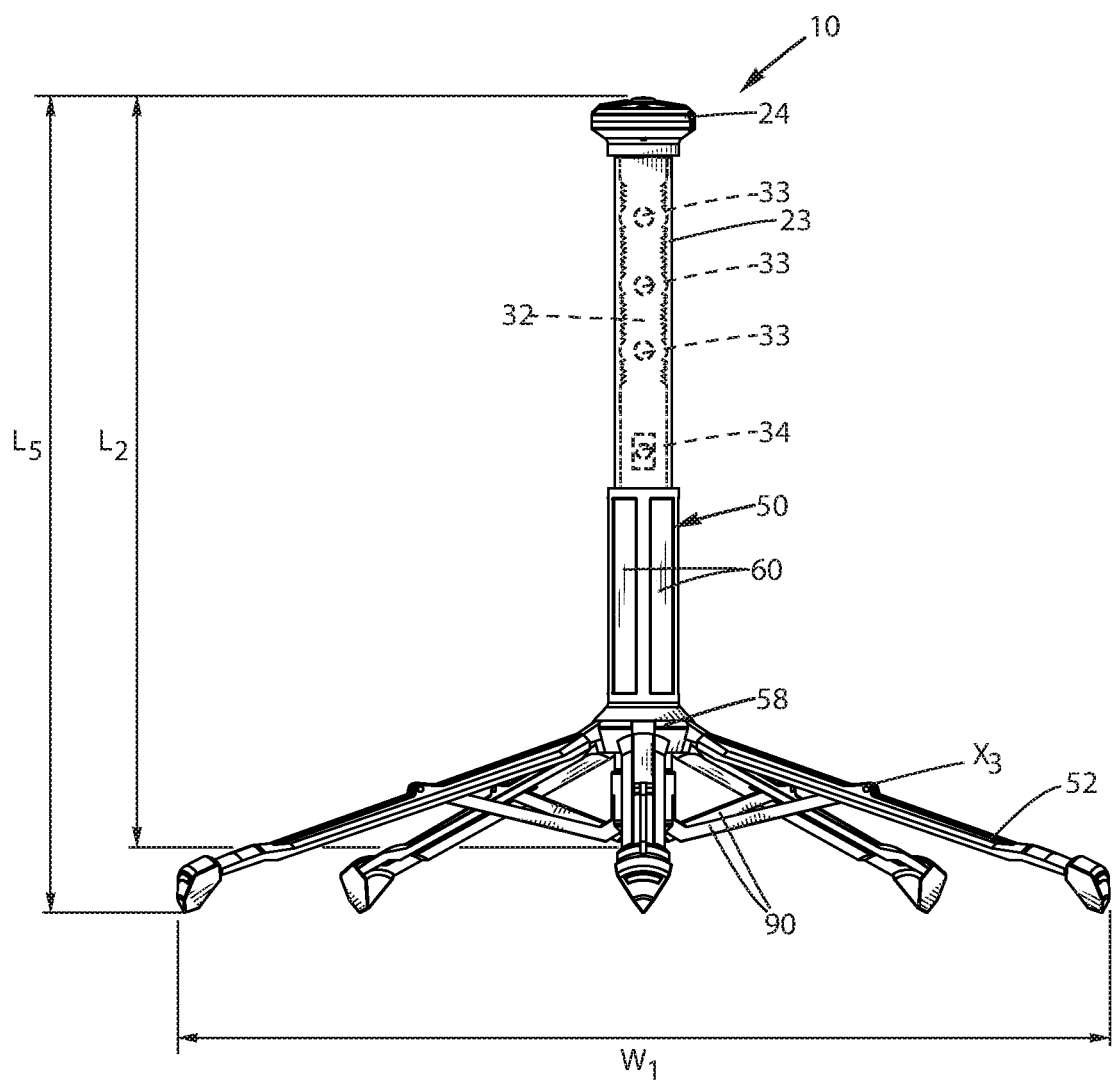
FIG. 7 is a side elevation view of the warning device of FIG. 1, wherein the collapsible stand is configured in the warning configuration.
Figure 13:
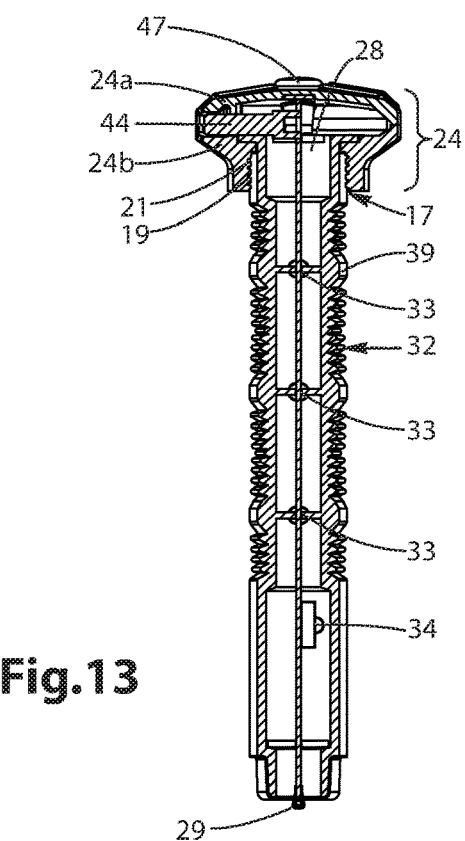
FIGS. 13 and 14 are sectional views of the light-emitting module of FIGS. 11 and 12, respectively taken along cross-section lines B-B of FIG. 11 and cross-section lines C-C of FIG. 12.

As represented in FIGS. 7 and 13, the light-emitting module 32 further comprises an actuator 34 electrically coupled to the light sources 33. In the embodiment shown, the actuator 34 comprises an infrared sensor which function will be better understood thereafter.

In the embodiment shown, as represented for instance in FIGS. 4 and 5, the lower end 29 of the light-emitting module 32 is electrically couplable to an upper end of the battery assembly 40 (or energy supply 40), and more particularly electrically couplable to one of the rechargeable batteries 42 extending in the inner cavity 38 defined in the lower section 26 of the body sleeve 23, so that the battery assembly 40 provides power to the light-emitting module 32.

It is appreciated that the shape and the configuration of the light-emitting assembly 22, as well as the structure of the light-emitting module 32 and the configuration and the location of the actuator 34 and the number, the configuration, and the location of the light sources 33 can vary from the embodiment shown.

Grabbing Portion

As represented for instance in FIGS. 11 to 14 and 23, in the embodiment shown, the grabbing portion 24 of the warning body 20 is mounted to the upper end 28 of the light-emitting module 32. When the light-emitting module 32 is inserted into the inner channel 37 of the body sleeve 23, the grabbing portion 24 is juxtaposed to the upper end 27 of the body sleeve 23 and engaged therewith. More particularly, at a lower end 19 of the grabbing portion 24, a sleeve-engaging cavity 17 is formed in the grabbing portion 24; the sleeve-engaging cavity 17 is delimited in the grabbing portion 24 by an inner peripheral wall. The upper end 28 of the light-emitting module 32 is at least partially inserted into the sleeve-engaging cavity 17. In the embodiment shown, when the grabbing portion 24 is mounted to the light-emitting module 32 by insertion of the translucent peripheral wall 39 of the light-emitting module 32 into the sleeve-engaging cavity 17 of the grabbing portion 24, an annular channel is defined between the inner peripheral wall of the grabbing portion 24 and the translucent peripheral wall 39 of the light-emitting module 32. The annular channel is accessible adjacent to the lower end 19 of the grabbing portion 24. The inner peripheral wall of the grabbing portion 24 delimitating outwardly the annular channel has a thread 21 formed thereon. The thread 21 is configured to cooperate with a corresponding thread 41 (FIGS. 4 and 22) formed on an outer surface of the upper end 27 of the body sleeve 23.

Figure 14:
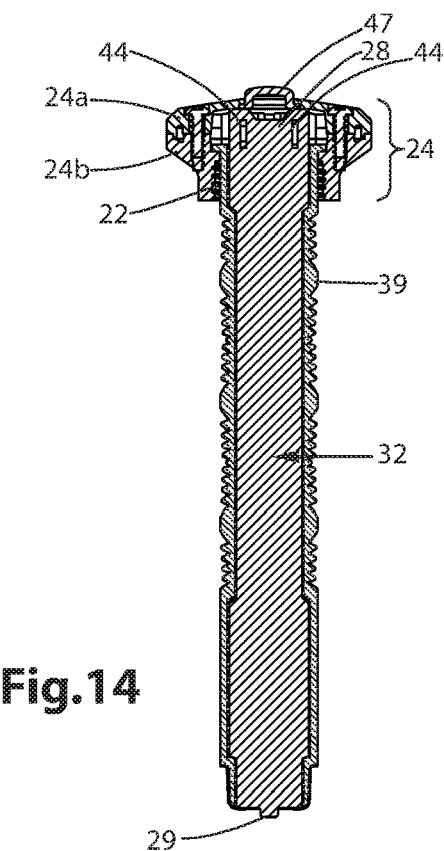
Figure 22:
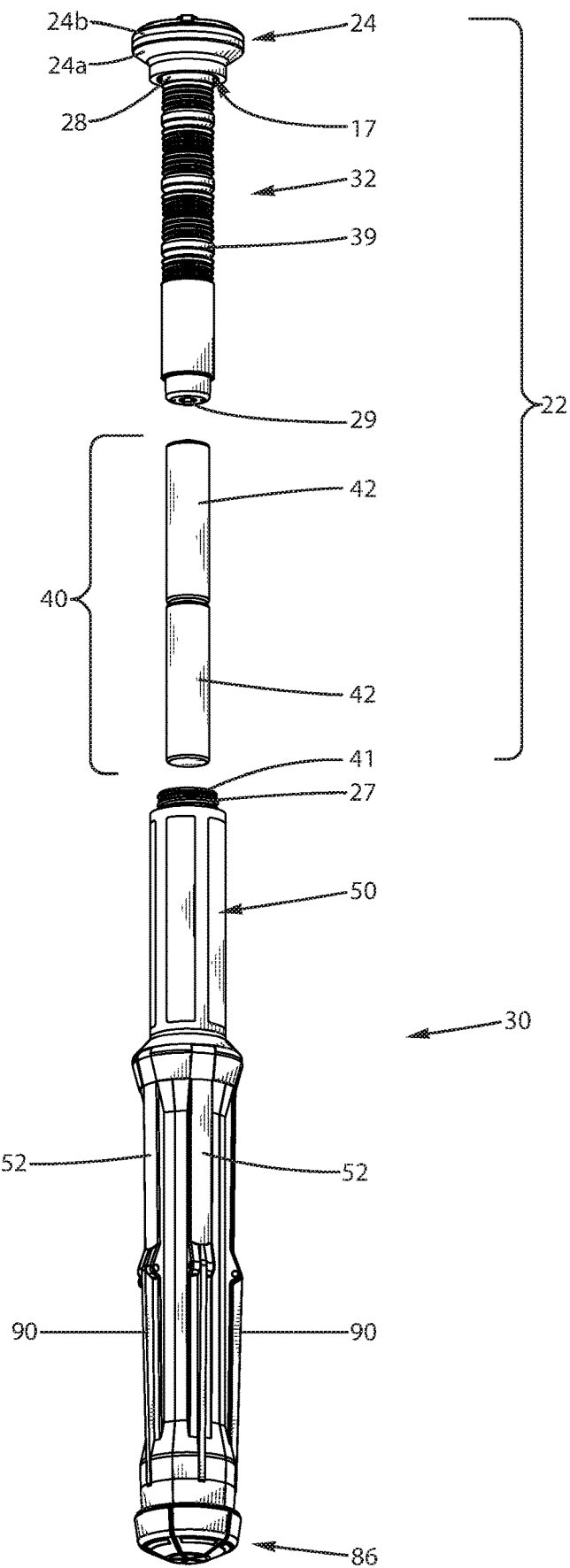
FIG. 22 is a partially exploded view of the warning device of FIG. 1.
Figure 23:
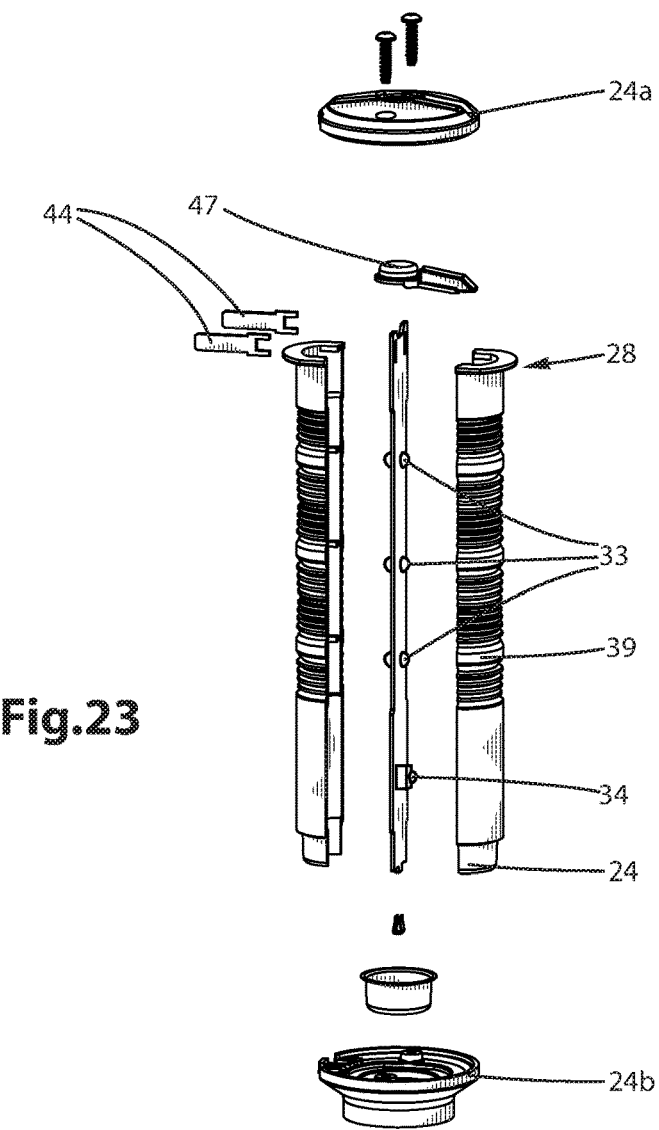
FIG. 23 is an exploded view of an upper portion of the light-emitting assembly of FIG. 1.

As represented in FIGS. 13, 14 and 22, in the embodiment shown, the grabbing portion 24 comprises an upper grabbing element 24a and a lower grabbing element 24b engageable together (for instance via screws or any other mechanical fasteners). As represented in FIG. 22, once the different components of the light-emitting module 32 are assembled together, the upper grabbing element 24a is mounted to the upper end 28 of the light-emitting module 32 while the lower grabbing element 24b is slid upwardly along the translucent peripheral wall 39 from the lower end 29 towards the upper end 28 of the light-emitting module 32, for an upper mounting ring extending outwardly from the translucent peripheral wall 39 to be sandwiched between the upper and lower grabbing elements 24a, 24b of the grabbing portion 24. In the embodiment shown, the sleeve-engaging cavity 17 is at least partially formed in the lower grabbing element 24b and between the upper and lower grabbing elements 24a, 24b.

The grabbing portion 24 can thus be easily detached from the body sleeve 23 (from the upper end 27 thereof, in the embodiment shown), so as to provide access to the light-emitting assembly 22, and more particularly access to the light-emitting module 32 thereof. Moreover, the grabbing portion 24 is easily detachable from the light-emitting module 32 so as to provide access to its different components.

In another embodiment (not shown), the lower end cap 85 of the warning body 20 could be removably mounted to the lower end 31 of the body sleeve 23 so as to easily provide access to the lower section of the light-emitting assembly 22 (for instance, to the energy supply 40 thereof) contained in the inner channel 37 of the body sleeve 23.

In the embodiment shown, as represented in FIG. 3, the grabbing portion 24 has an outer cross-section d4 (or outer diameter 24 in the embodiment in which the upper grabbing element 24a has a substantially circular shape or outer grabbing diameter d4) (considered in a direction substantially perpendicular to the longitudinal axis X) greater than an outer cross-section d3 (or outer diameter d3, in the embodiment in which the body sleeve 23 has a substantially cylindrical shape, or outer body sleeve diameter d3) of the body sleeve 23, also considered in a direction substantially perpendicular to the longitudinal axis X, so as to ease the grabbing of the warning device 10 by a user. In some embodiments, the outer diameter d4 of the grabbing portion 24 is at least about 10% greater than the outer diameter d3 of the body sleeve 23. In some other embodiments, the outer diameter d4 of the grabbing portion 24 is at least about 20% greater than the outer diameter d3 of the body sleeve 23. In yet some other embodiments, the outer diameter d4 of the grabbing portion 24 is at least about 40% greater than the outer diameter d3 of the body sleeve 23.

The grabbing portion 24 could alternatively be formed integral with at least one of the body sleeve 23 and the light-emitting assembly 22 (for instance formed integral with the upper end 28 of the light-emitting module 32).

In the embodiment shown, the grabbing portion 24 can be considered as being part of the light-emitting assembly 22 since the grabbing portion 24 is electrically coupled to the battery assembly 40 via the lower end 29 of the light-emitting assembly 22 and further comprises a battery charge indicator 47 configured to indicate a level of charge of the battery assembly 40, as represented in FIGS. 11 to 14.

In the embodiment shown, the grabbing portion 24 further comprises an electric port 44, for instance on a rear portion thereof, couplable—directly or indirectly—to a power source and thus configured to electrically couple the battery assembly 40 to the power source, so as to provide power to the rechargeable battery assembly 40, i.e. to recharge the rechargeable battery assembly 40.

It is thus understood that in the embodiment shown, the grabbing portion 24, the light-emitting module 32 and the energy supply 40 are electrically coupled together for the warning body 20 to generate a light signal, such as a warning light signal, at least when the collapsible stand 30 is configured in the warning configuration. More particularly, the grabbing portion 24 is electrically coupled to the upper end 28 of the light-emitting module 32, whereas the energy supply 40 (or the battery assembly 40, in the embodiment shown) is electrically coupled to the lower end 29 of the light-emitting module 32, for the batteries 42 of the energy supply 40 to supply power to the light-emitting module 32, for its light sources 33 to generate the warning light signal.

It is appreciated that the shape and the configuration of the grabbing portion 24, as well as the shape, the configuration and the number of its elements can vary from the embodiment shown. Furthermore, in an alternative embodiment, the grabbing portion 24 could be exempt of electrical features and solely close the inner channel of the sleeve 23.

Collapsible Stand

Figure 25:
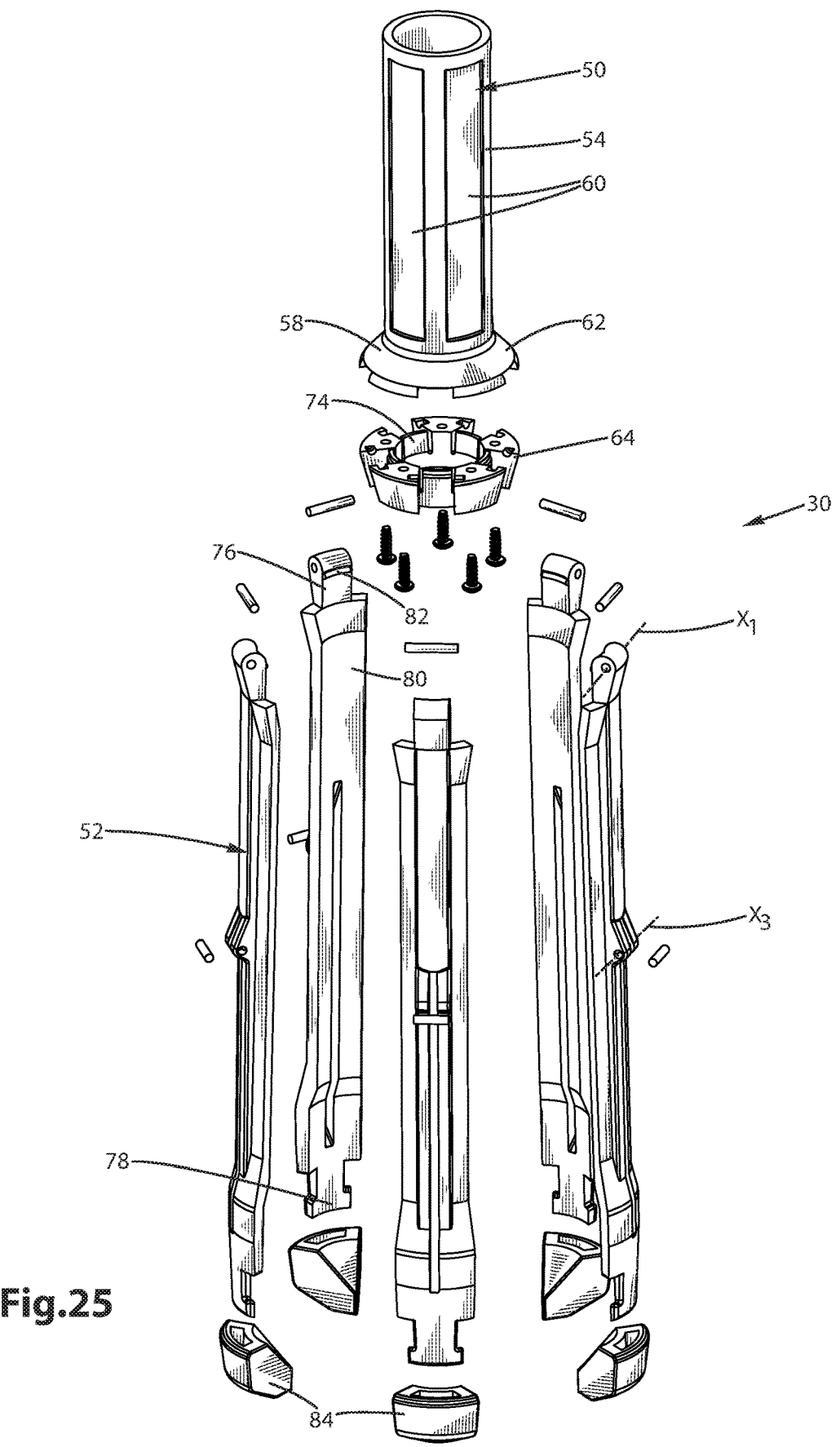
FIG. 25 is an exploded view of the collapsible stand, with leg-connecting rods being removed from the collapsible stand.

As represented in FIGS. 1 to 10 and in FIG. 25, the collapsible stand 30 comprises a handle sleeve 50 mounted to and slidable along the warning body 20 (at least slidable along an axial portion thereof, for instance slidable along an axial portion of the translucent sleeve 23, in the embodiment shown), and a plurality of legs 52 pivotably mounted to the handle sleeve 50. As represented in FIGS. 2 and 3, the plurality of legs 52 are juxtaposed against the warning body 20 when the collapsible stand 30 is configured in the compacted configuration to at least partially cover the warning body 20. It is thus understood that, when the collapsible stand 30 is configured in the compacted configuration, the warning device 10 has substantially the shape of a baton or a stick.

When the collapsible stand 30 is configured in the warning configuration, as represented for instance in FIG. 1, the plurality of legs 52 extend outwardly and downwardly from the handle sleeve 50. In the following description, the term outwardly should be understood with regard to the inner channel 37 defined by the sleeve 23 (or body sleeve 23) of the warning body 20.

As detailed below, the collapsible stand 30 is configurable between the compacted configuration and the warning configuration by sliding the handle sleeve 50 along at least an axial—or longitudinal—portion of the warning body 20.

Handle Sleeve

As represented for instance in FIG. 3, the handle sleeve 50 is slidably mounted to the sleeve 23 of the warning body 20 and surrounds same. The handle sleeve 50 has a body 54 (or handle body 54) defining an inner channel, which shape substantially conforms to an outer shape of the body sleeve 23. In the embodiment shown, the body 54 is substantially annular or cylindrical to define a substantially cylindrical inner channel. It could however be conceived a warning device 10 having a handle sleeve 50 and a body sleeve 23 which would not have a substantially cylindrical shape, as long as the handle sleeve 50 and the body sleeve 23 would be shaped and dimensioned to slide along each other. The body 54 of the handle sleeve 50 has an outer surface 56. The handle sleeve 50 further includes a handle base 58 (or base 58) protruding outwardly in a lower section thereof. The base 58 can be mounted to or be integral with the cylindrical body 54.

Figure 15:
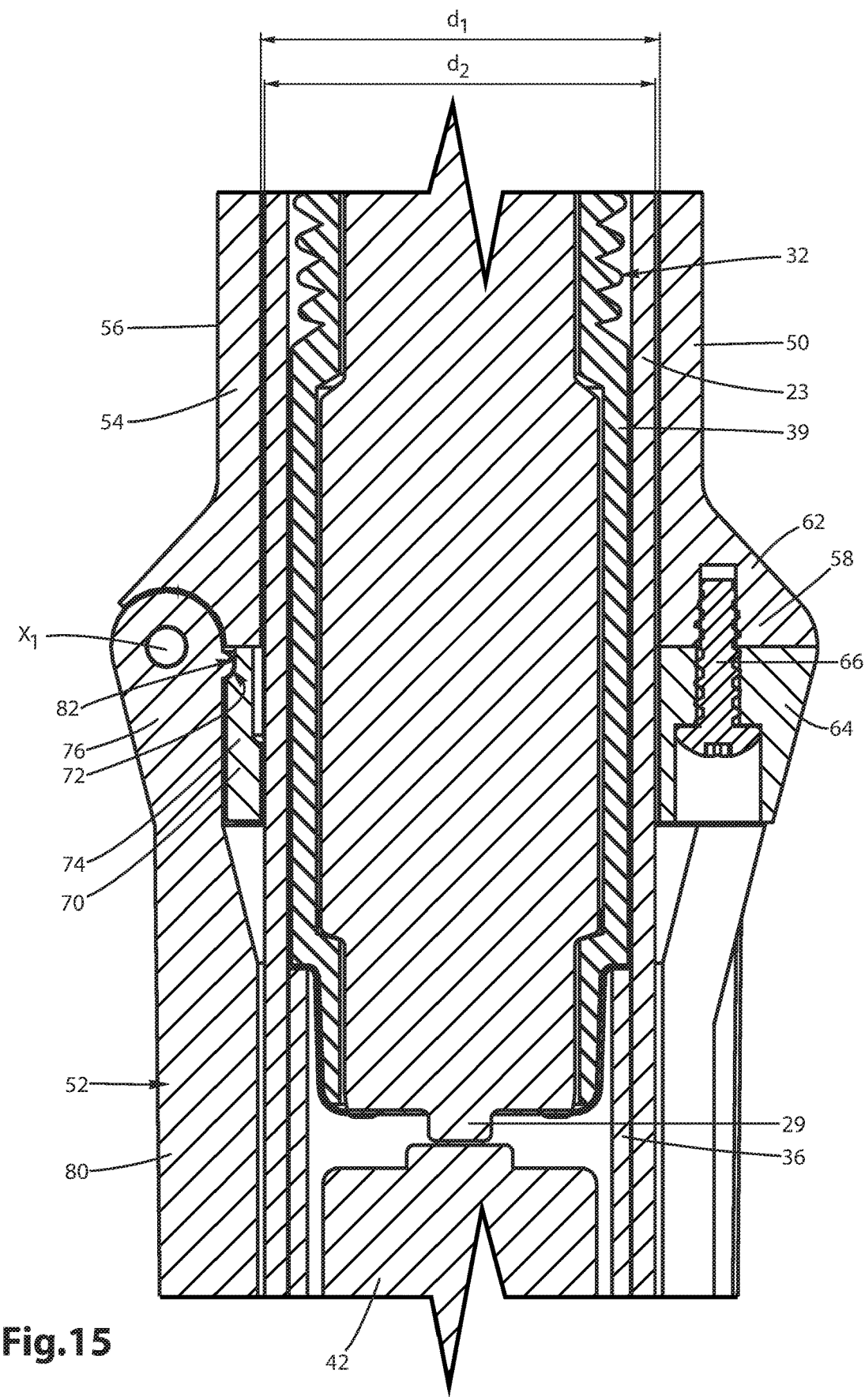
FIG. 15 is a sectional view of a central portion of the warning device of FIG. 1, around a base of the handle sleeve, taken along cross-section lines A-A of FIG. 3.

In the embodiment shown, as represented in FIG. 15, the handle base 58 comprises two complementary portions 62, 64 secured to each other, by mechanical fasteners 66 such as screws.

The handle sleeve 50 is coaxial with the body sleeve 23 of the warning body 20. The handle body 54 of the handle sleeve 50 has an inner cross-section d1 (or inner diameter d1, in the embodiment in which the handle body 54 is substantially cylindrical in shape), as represented in FIGS. 5 and 15, that is equal to or slightly larger than an outer cross-section d2 of the sleeve 23 (or outer diameter d2, in the embodiment in which the sleeve is substantially cylindrical in shape), so that the handle sleeve 50 is slidable along the outer surface of the sleeve 23 along the longitudinal axis X.

In the embodiment shown, as represented for instance in FIG. 1, the handle sleeve 50 comprises luminescent strips 60, for instance substantially rectangular, mounted to the outer surface 56 of the handle body 54. The luminescent strips 60 are configured to reflect light, so as to increase the visibility of the warning device 10. It is appreciated that the shape and the configuration of the luminescent strips 60 can vary from the embodiment shown. It could also be conceived a warning device 10 having no luminescent strips 60 on the outer surface of the handle sleeve 50 and/or having luminescent strips 60 arranged on other parts of the warning device 10 (for instance on an outer surface of one or more of the legs 52).

The outer surface 56 of the body 54 might further comprise handling portions configured to ease the handling of the handling sleeve 50, and thus ease the handling of the warning device 10.

Figure 16:
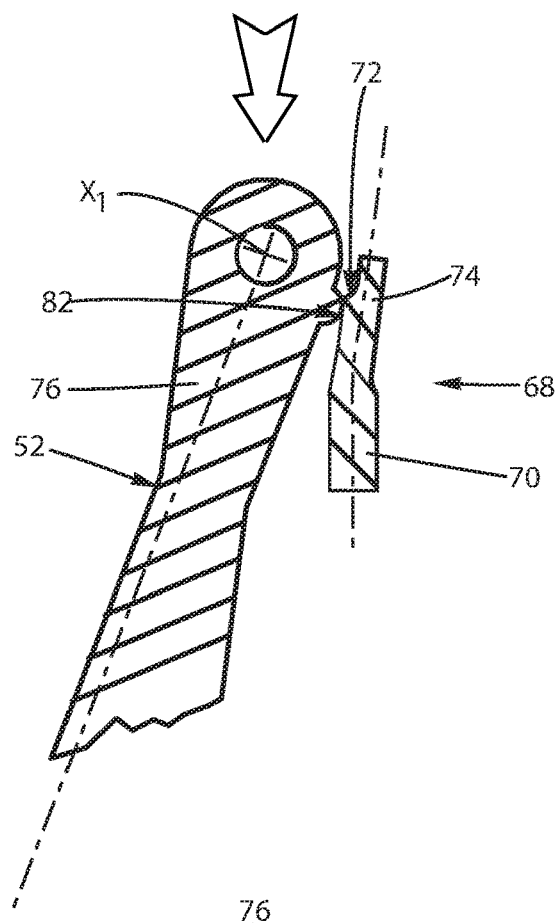
FIGS. 16 and 17 are enlarged views of a portion of the base of the handle sleeve and a proximal end of a leg of the collapsible stand of FIG. 15, the collapsible stand being respectively configured in the intermediate configuration and in the compacted configuration.
Figure 17:
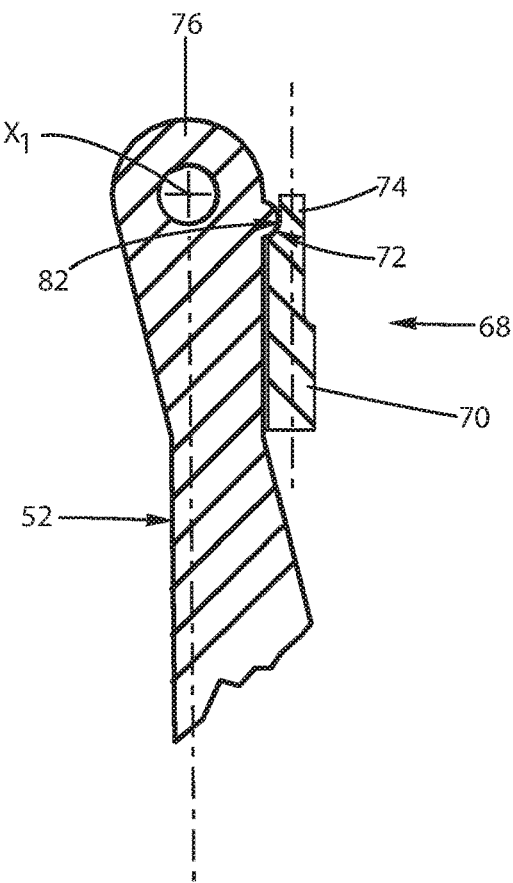

Turning now to FIGS. 15 to 17, there is shown that the base 58 of the handle sleeve 50 further comprises a blocking assembly 68, comprising, in the embodiment shown, a blocking ring 70 extending circumferentially around the outer surface of the body sleeve 23 of the warning body 20. In the embodiment shown, as represented in FIGS. 15 to 17, the blocking ring 70 of the blocking assembly 68 also comprises a bendable (or deflectable) portion 74 including a receiving recess 72 defined on an outer surface of the blocking ring 70, which functions will be described thereafter. In the embodiment shown, the blocking ring 70 is formed by a portion of the lower complementary portion 64 of the base 58. In the embodiment shown, the lower complementary portion 64 has a thickness varying along its periphery. It is however appreciated that the shape and configuration of the blocking assembly 68 and of its blocking ring 70 can vary from the embodiment shown.

It is also appreciated that the shape and the configuration of the handle sleeve 50 can vary from the embodiment shown.

Legs

As represented in particular in FIGS. 1, 4, 6 and 7, the collapsible stand 30 comprises a plurality of legs 52 (five, in the embodiment shown) angularly spaced-apart from each other. The number of legs 52 can obviously differ from the embodiment shown. In the embodiment shown, the five legs 52 are substantially regularly spaced-apart from each other when the collapsible stand 30 is configured in the warning configuration.

In the embodiment shown, the legs 52 have a similar shape, so that the following description of one of the legs 52 will apply to any of them.

The leg 52 has a leg body 80 extending between a proximal end 76 and a distal end 78.

At its proximal end 76, the leg 52 is pivotally mounted to the handle sleeve 50 about a pivot axis X1. In the embodiment shown, the pivot axis X1 extends substantially perpendicularly to the longitudinal axis X of the warning body 20.

In the embodiment shown, the proximal end 76 is pivotally mounted about the pivot axis X1 to the base 58 of the handle sleeve 50. For instance, as represented in FIG. 15, the proximal end 76 of the leg 52 is mounted between the two complementary portions 62, 64 forming the base 58.

As represented in FIGS. 15 to 17, the proximal end 76 comprises a protrusion 82 protruding outwardly and towards the handle sleeve 50. The protrusion 82 is dimensioned to be received in the receiving recess 72 defined in the outer surface of the blocking ring 70 of the blocking assembly 68.

As represented in FIG. 1, the distal end 78 is spaced apart—moved away—from the warning body 20 when the collapsible stand 30 is configured in the warning configuration.

In some embodiments, as represented in FIG. 5, the leg 52 forms an angle α with the lower section 26 of the sleeve 23 of the warning body 20 (or with the longitudinal axis X of the warning body 20) comprised between about 15° and about 180° when the collapsible stand 30 is configured in the warning configuration. In some other embodiments, the angle α is comprised between about 30° and about 150° when the collapsible stand 30 is configured in the warning configuration. In some other embodiments, the angle α is comprised between about 60° and about 120° when the collapsible stand 30 is configured in the warning configuration. In some other embodiments, the angle α is comprised between about 80° and about 100° when the collapsible stand 30 is configured in the warning configuration.

The distal end 78 of the leg 52 comprises a leg cap 84. In the embodiment shown, the leg cap 84 is at least partially made of a material having some absorbent characteristics, such as elastomeric material or TPR (trans-polypentenamer natural rubber).

The leg caps 84 of the different legs 52 of the collapsible stand 30 are configured to form together, when the collapsible stand 30 is configured in the compacted configuration, a protection cap 86, as represented in FIG. 2, covering at least partially the lower end 31 of the sleeve 23 of the warning body 20 and the lower end cap 85 of the warning body 20.

It is appreciated that the shape, the configuration, the number, and the location of the legs 52 with regards to the handle sleeve 50 and to the warning body 20 can vary from the embodiment shown.

Leg-Connecting Rods (or Led Deployment-Limiting Rods)

The collapsible stand 30 further comprises a plurality of leg-connecting rods 90 (or leg deployment-limiting rods 90) connecting each one of said plurality of legs 52 to the warning body 20. As detailed below, the leg-connecting rods 90 are configured to limit the deployment of the legs 52 when the collapsible stand 30 is configured in the warning configuration.

In the embodiment shown, the leg-connecting rods 90 have a similar shape, so that the following description of one of the leg-connecting rods 90 will apply to any of them.

The leg-connecting rod 90 comprises a proximal end 92 pivotably mounted to the lower portion 26 of the warning body 20 about a pivot axis X2. The leg-connecting rod 90 further comprises a distal end 94 pivotably mounted to one of the legs 52 about a pivot axis X3. In the embodiment shown, the proximal end 92 of the leg-connecting rod 90 is mounted to the lower end cap 85 of the warning body 20, the pivot axis X2 being for instance sandwiched between different components forming the lower end cap 85, as represented in FIG. 25.

In the embodiment shown, the pivot axes X2 and X3 of the proximal end 92 and the distal end 94 are substantially parallel to each other. In the embodiment shown, the pivot axes X2 and X3 are substantially parallel to the pivot axis X1 of the legs 52, and are thus substantially perpendicular to the longitudinal axis X of the warning body 20.

Figure 24:
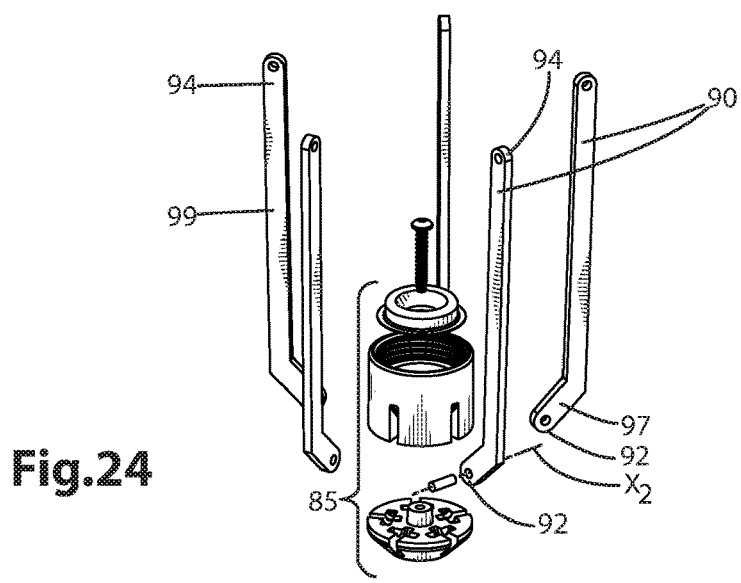
FIG. 24 is an exploded view of a lower portion of the warning device of FIG. 1.

The leg-connecting rod 90 further comprises a body 96 (or rod body 96) extending between the proximal and distal ends 92, 94. In the embodiment shown, as represented for instance in FIG. 24 the rod body 96 comprises proximal and distal portions 97, 99 (or proximal and distal end portions 97, 99 comprising respectively the proximal and distal ends 92, 94) angled relative to each other, but a rod body 96 having a single straight portion could obviously also be conceived.

In the embodiment shown, the distal end 94 is pivotably mounted about the pivot axis X3 to a central portion of the longitudinal body 80 of the corresponding leg 52.

In the embodiment shown, the leg-connecting rod 90 extends along the lower portion 26 of the warning body 20 when the collapsible stand 30 is configured in the compacted configuration, as represented in FIG. 4. In the embodiment shown, as represented for instance in FIG. 6, a rod-receiving slot 51 (or rod-receiving groove 51) is formed in the leg 52 (for instance in the leg body 80 thereof). The rod-receiving slot 51 is shaped and dimensioned to receive at least partially the corresponding leg-connecting rod 90 when the collapsible stand 30 is configured in the compacted configuration.

In some embodiments, as represented in FIG. 5, the leg-connecting rod 90 (its proximal end portion 97, in the embodiment shown) forms an angle β with the lower portion 26 of the sleeve 23 of the warning body 20 (or with the longitudinal axis X of the warning body 20, in the embodiment shown) comprised between about 15° and about 150° when the collapsible stand 30 is configured in the warning configuration. In some other embodiments, the angle β is comprised between about 30° and about 130° when the collapsible stand 30 is configured in the warning configuration. In yet some other embodiments, the angle β is comprised between about 60° and about 120° when the collapsible stand 30 is configured in the warning configuration. It is thus understood that the leg-connecting rod 90 is configured to limit the outward and downward displacement of the leg 52, when the collapsible stand 30 is configured in the warning configuration.

In the embodiment shown, the leg-connecting rod 90 is made of metal, such as aluminum, so as to limit a total weight of the warning device 10.

It is appreciated that the shape, the configuration, the number and the location of the leg-connecting rods 90 with regards to the legs 52 and to the warning body 20 can vary from the embodiment shown.

Method for Installing the Warning Device

It is understood that the warning device 10 according to the present disclosure is configured to be easily stored and/or transported, when the collapsible stand 30 is configured in the compacted configured. The warning device 10 is further configured to be easily and stably deployed so as to provide an efficient warning light signal, when the collapsible stand 30 is configured in the warning configuration. The warning device 10 is also configured for the collapsible stand 30 to be easily, effortlessly and quickly configured from one of the compacted and warning configurations to the other.

Referring more particularly to FIGS. 2 and 3, when the collapsible stand 30 is configured in the compacted configuration, the warning device 10 can be easily transported and stored and only requires a limited storage space. When the collapsible stand is configured in the compacted configuration, the legs 52 substantially extend along the lower portion 26 of the warning body 20 and at least partially cover same.

In the embodiment shown, the legs 52, and more particularly their leg bodies 80, are dimensioned and shaped so as to be in close cooperation with the outer surface of the body sleeve 23 of the warning body 20, and more particularly with the lower section 26 of the sleeve 23 of the warning body 20. It is thus understood that the legs 52 form a protective layer surrounding at least partially the warning body 20, and more particularly surrounding at least partially the lower section 26 of the sleeve 23, so as to protect the light-emitting assembly 22 of the warning body 20.

In some embodiments, as represented in FIG. 3, the legs 52 have a length L1 considered along the longitudinal axis X when the collapsible stand 30 is configured in the compacted configuration. The length L1 extends along at least about 30% of a length L2 of the warning body 20, also considered along the longitudinal axis X. In some other embodiments, the length L1 of the legs 52 extends along at least about 50% of the length L2 of the warning body 20. In yet some other embodiments, the length L1 of the legs 52 extends along at least about 70% of the length L2 of the warning body 20.

In some embodiments, the length L2 of the warning body 20 is comprised between about 20 cm and about 60 cm. In some other embodiments, the length L2 of the warning body 20 is comprised between about 30 cm and about 40 cm.

When the collapsible stand 30 is configured in the compacted configuration, the handle sleeve 50 at least partially covers the light-emitting assembly 22 of the warning body 20. In the embodiment shown, the handle sleeve 50 is dimensioned so as to substantially cover the light-emitting module 32 of the light-emitting assembly 22.

In some embodiments, as represented in FIG. 3, the handle sleeve 50 has a length L3 considered along the longitudinal axis X. The length L3 extends along at least about 10% of the length L2 of the warning body 20. In some other embodiments, the length L3 of the handle sleeve 50 extends along at least about 20% of the length L2 of the warning body 20. In yet some other embodiments, the length L3 of the handle sleeve 50 extends along at least about 30% of the length L2 of the warning body 20.

Figure 6:
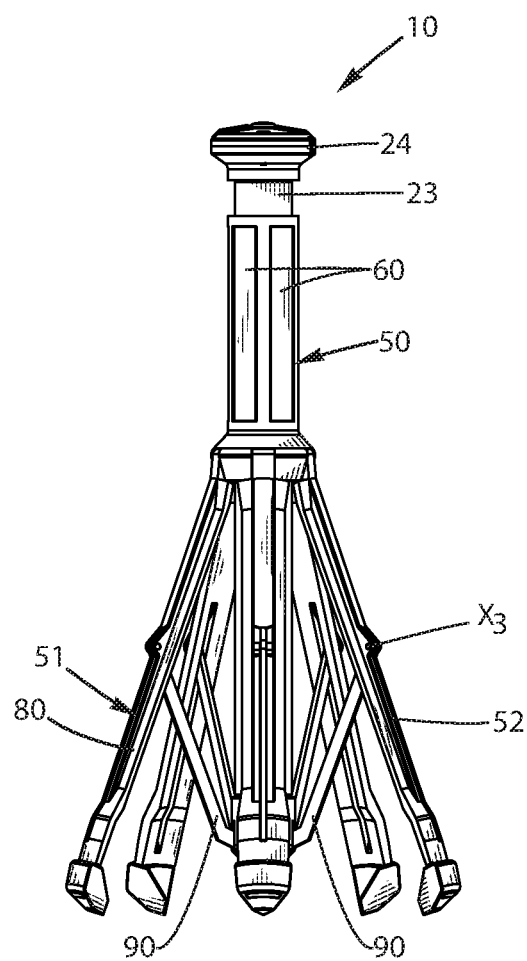
FIG. 6 is a side elevation view of the warning device of FIG. 1, wherein the collapsible stand is configured in an intermediate configuration between the compacted configuration and the warning configuration.

As represented in FIG. 6, when the collapsible stand 30 is configured in the compacted configuration, an outer diameter d5 of the plurality of the legs 52 surrounding the warning body 20 (for instance an outer diameter d5—or outer cross-section—of the distal ends 78 of the legs 52 when the collapsible stand 30 is configured in the compacted configuration), considered transversally to the longitudinal axis X, is substantially equal to the outer diameter d4—or outer cross-section d4—of the grabbing portion 24 of the warning body 20.

Moreover, the cooperation of the protrusions 82 of the legs 52 with the receiving recesses 72 of the blocking assembly 68 of the handle sleeve 50 prevents any unintentional pivoting of the legs 52 about the pivot axis X1 when the collapsible stand 30 is configured in the compacted configuration.

Referring now more particularly to FIGS. 1 and 5, when the collapsible stand 30 is configured in the warning configuration, the distal ends 78 of the legs 52 are angularly spaced from each other so as to ensure a stable support to the warning body 20.

In other words, when the collapsible stand 30 is configured in the warning configuration, the legs 52 are spaced-apart from one another and extend radially about the warning body 20 to support the warning body 20 in a substantially upright position. As represented in FIG. 7, when the collapsible stand 30 is configured in the warning configuration, the legs 52 form a support base having a width W1 considered transversally to the longitudinal axis X that is substantially equal or even greater than the length L2 of the warning body 20. In some embodiments, the width W1 of the deployed legs 52 (or width W1 of the collapsible stand 30) is comprised between about 25 cm and about 60 cm. In some other embodiments, the width W1 is comprised between about 40 cm and about 50 cm.

As represented in FIG. 7, the legs 52 are arranged so that the warning device 10 has a length L5, considered along a direction substantially parallel to the longitudinal axis X of the warning body 20, that is greater, when the collapsible stand 30 is configured in the warning configuration, than the length L2 of the warning body 20. The arrangement of the legs 52 thus further contributes to the visibility of the light-emitting module 32, and thus to the efficiency of the warning device 10.

It is to be noted that the arrangement of the battery assembly 40 in the lower section 26 of the sleeve 23 of the warning body 20, by lowering the gravity center of the warning device 10, contributes to the stability of the warning device 10 when the collapsible stand 30 is configured in the warning configuration.

Figure 8:
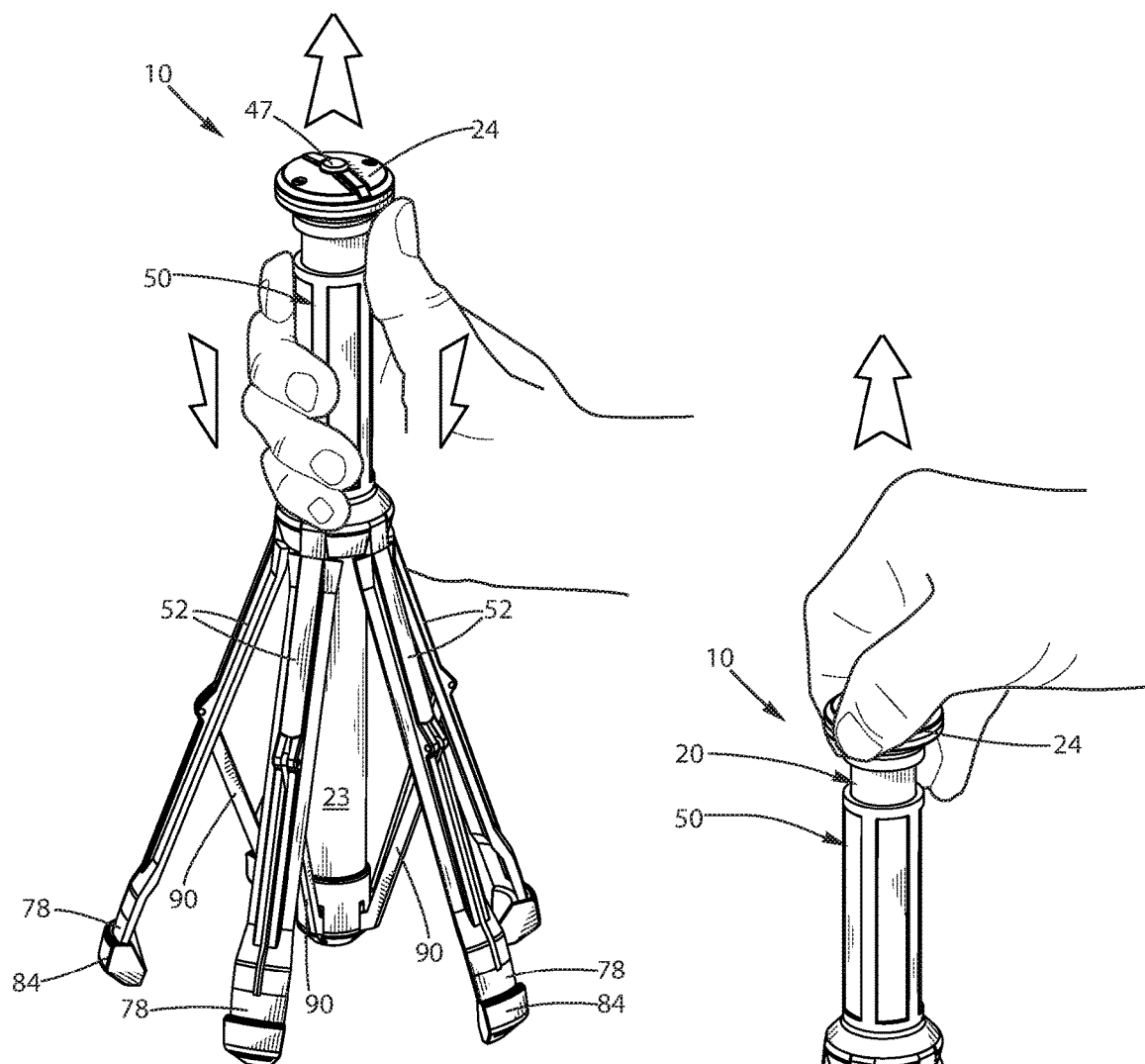
FIGS. 8 and 9 are top perspective views of the warning device of FIG. 1, wherein the warning body comprises a grabbing portion and the collapsible stand includes a handle sleeve that is slid downwardly along at least a portion of the warning body for the collapsible stand to be configured from the compacted configuration to the warning configuration upon manipulation respectively of the handle sleeve and the grabbing portion by a user.
Figure 9:
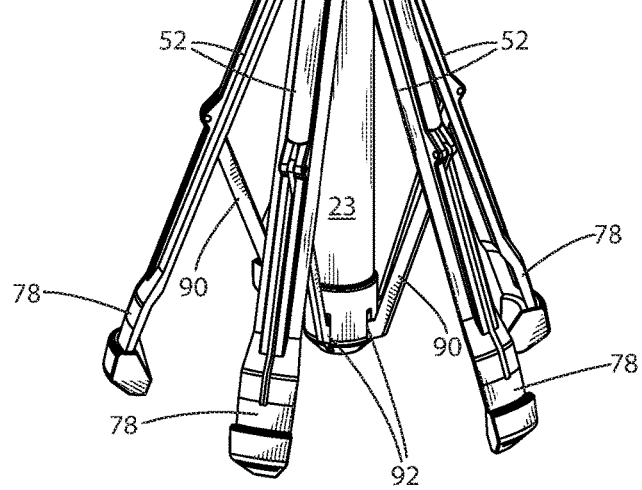

Referring now more particularly to FIGS. 8 and 9, the warning device 10 is configured so that the collapsible stand 30 can be easily configured from the compacted configuration in the warning configuration.

As represented in FIG. 8, the user grabs the handle sleeve 50 and pulls upwardly the grabbing portion 24, so as to slide the handle sleeve 50 downwardly along the sleeve 23 of the warning body 20. In other words, by using one single hand and exerting a pressure by a finger (for instance by a thumb), the user can easily slide downwardly the handle sleeve 50 with regard to the grabbing portion 24, so as to configure the collapsible stand 30 from the compacted configuration into the warning configuration.

By doing so, the leg-connecting rods 90 start pivoting outwardly about the pivot axis X3 and make the legs 52 start pivoting outwardly about the pivot axis X1. As represented in FIG. 16, for the legs 52 to start pivoting, a force sufficient to bend inwardly the bendable portion 74 of the blocking assembly 68 of the handle sleeve 50 has to be exerted, so that the protrusion 82 of the legs 52 can be released from the receiving recess 72 (or blocking recess 72).

As represented in FIG. 9, the deployment of the legs 52 is pursued by the handle sleeve 50 further sliding downwardly along the sleeve 23 of the warning body 20. In the embodiment shown, the legs 52 and/or the handle sleeve 50 are shaped and dimensioned so that the handle sleeve 50 easily slides along the sleeve 23 of the warning body 20 once the sliding has been initiated.

The sliding of the handle sleeve 50 downwardly along the sleeve 23 of the warning body 20 further makes the light-emitting module 32 of the warning body 20 visible. In the embodiment shown, the actuator 34 is configured to automatically actuate the light-emitting module 32 once the handle sleeve 50 has been slid downwardly along a predetermined length of the sleeve 23 of the warning body 20.

The actuator 34 thus contributes to the efficiency of the warning device 10, by ensuring that a light (or warning light signal) is automatically emitted when the handle sleeve 50 has been sufficiently downwardly slid along the warning body 20. It thus contributes to limit the time required to install the warning device 10. Moreover, the actuator 34 is configured to limit the risk that lights are unnecessarily emitted when the collapsible stand 30 is configured in the compacted configuration, so as to limit the loss of power by the battery assembly 40.

It is to be noted that only a few seconds are required for the user to configure the collapsible stand 30 from the compacted configuration to the warning configuration, and thus to install the warning device 10 and emit a warning light signal. In some embodiments, less than 3 seconds are required to install the warning device 10.

Figure 10:
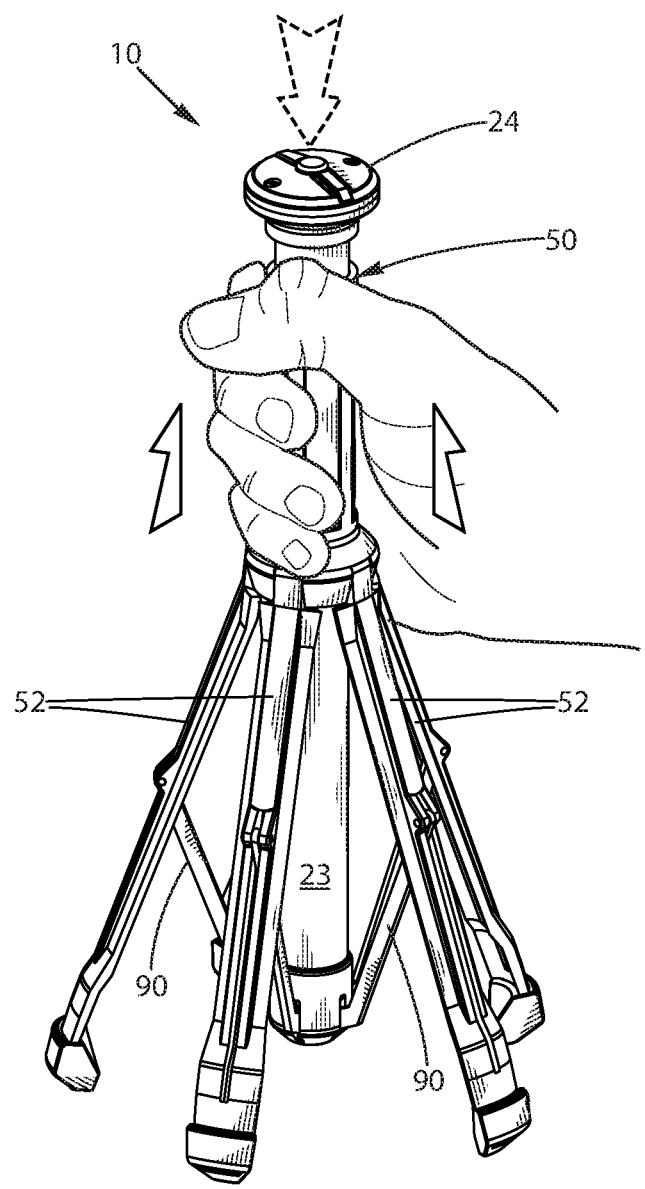
FIG. 10 is a top perspective view of the warning device of FIG. 1, wherein the handle sleeve is slid upwardly along the warning body for the collapsible stand to be configured from the warning configuration to the compacted configuration.
Figure 11:
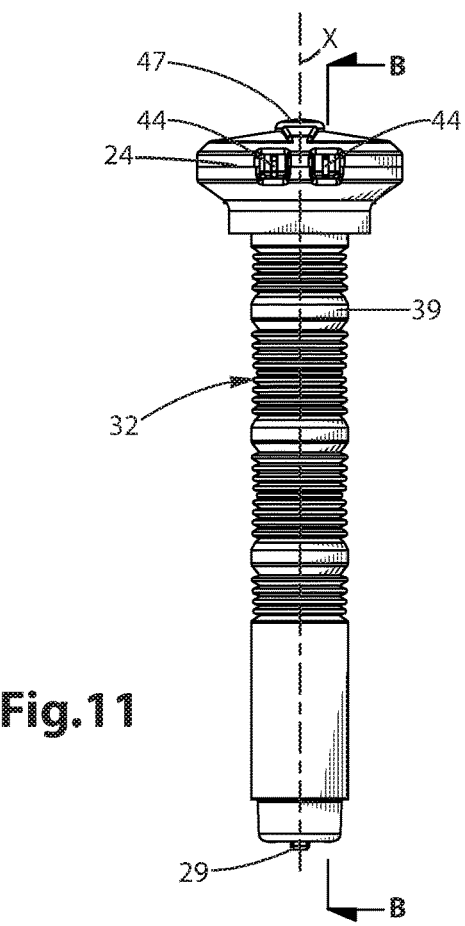
FIGS. 11 and 12 are respectively rear and side elevation views of a light-emitting module of the warning body of the warning device of FIG. 1, removed from a translucent sleeve.
Figure 12:
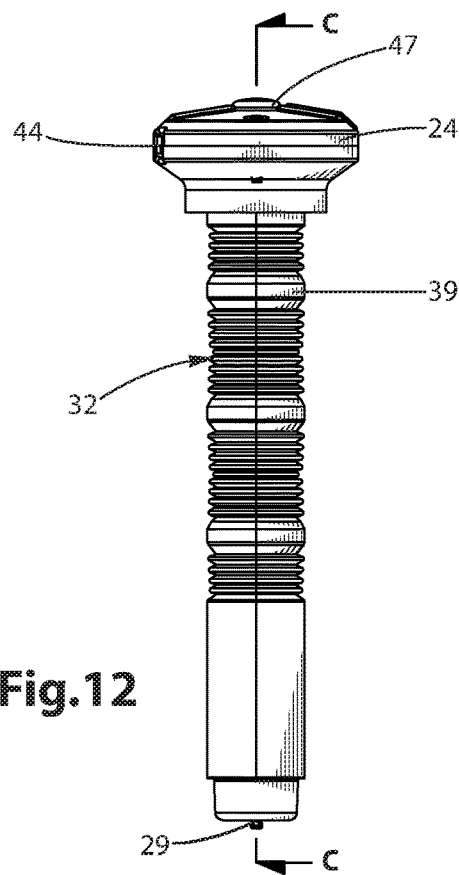

Referring now more particularly to FIG. 10, the warning device 10 is configured so that the collapsible stand 30 can be easily configured from the warning configuration in the compacted configuration.

To do so, the used holds the handle sleeve 50 and slide it upwardly along the warning body 20, towards the grabbing portion 24. In the embodiment shown, the legs 52 and/or the leg-connecting rods 90 are shaped and dimensioned so as to automatically pivot inwardly towards the lower section 26 of the sleeve 23 of the warning body 20 when the handle sleeve 50 is slid upwardly towards the grabbing portion 24.

The cooperation of the protrusions 82 of the legs 52 with the receiving recess 72 (or blocking recess 72) of the blocking assembly 68 of the handle sleeve 50 ensures the blocking of the legs 52 in a position in which they substantially extend along the lower section 26 of the sleeve 23 of the warning body 20.

In an embodiment (not shown), the handle sleeve 50 is configured to cooperate with the warning body 20, for instance with the grabbing portion 24, so as to further maintain the collapsible stand 30 configured in the compacted cooperation and to limit the risk of the collapsible stand 30 being accidentally configured in the warning configuration.

Warning Assembly

The present disclosure also concerns a warning assembly 200 comprising one or more warning devices 10 and different accessories.

Storage Box

Figure 18:
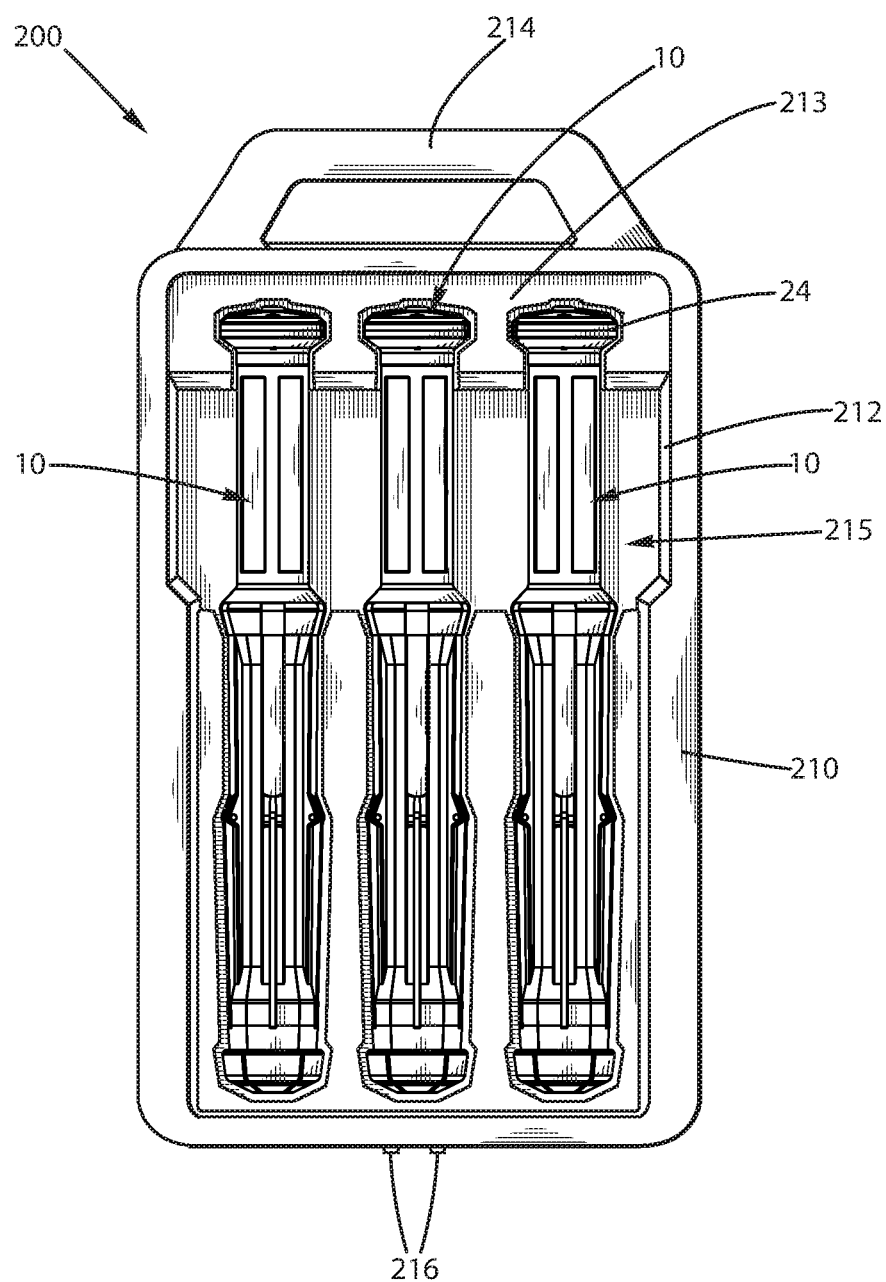
FIG. 18 is a front elevation view of a storage box with warning devices contained therein, in accordance with an embodiment.

In the embodiment shown, as represented in FIG. 18, the warning assembly 200 comprises a storage box 210 having a storage housing 212 defining a cavity 215 dimensioned to receive a plurality of warning devices 10 (three in the embodiment shown, but could be dimensioned to contain more or less warning devices 10).

The storage housing 212 comprises a charging portion 213 (or box charging portion 213) configured to cooperate with the grabbing portions 24 of the warning devices 10 received in the cavity 215, and more particularly with the electric ports 44 of the warning devices 10.

The storage box 210 further comprises a handling portion 214 to ease the handling and transport of the storage box 210, and an electric port 216 (or box electric port 216) to cooperate with a power source (not represented) to charge the warning devices 10 via the charging portion 213 and the electric ports 44 of the grabbing portions 24 of the warning devices 10.

Wall Support

Figure 19:
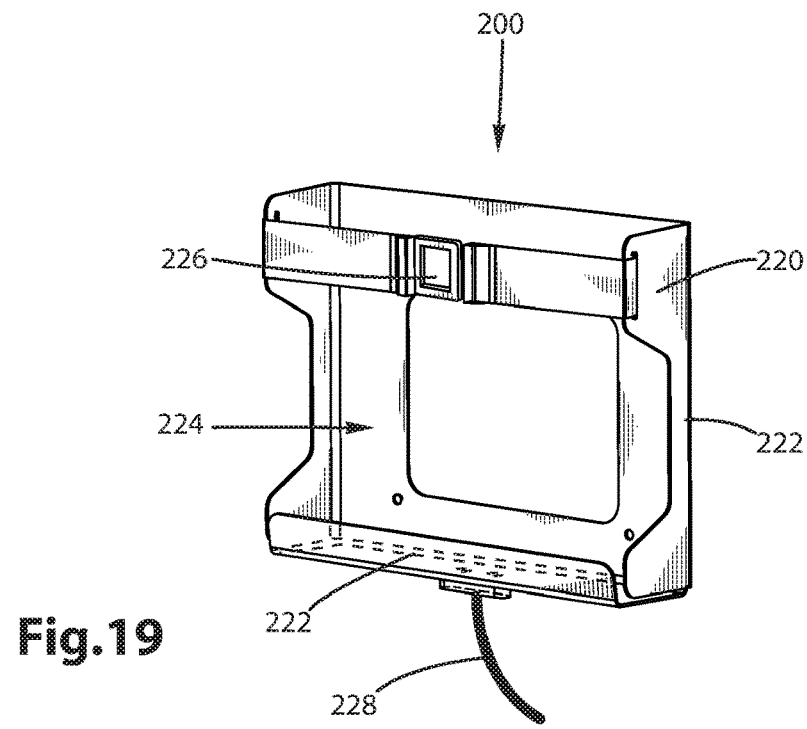
FIG. 19 is a right perspective view of a wall support in accordance with an embodiment.
Figure 20:
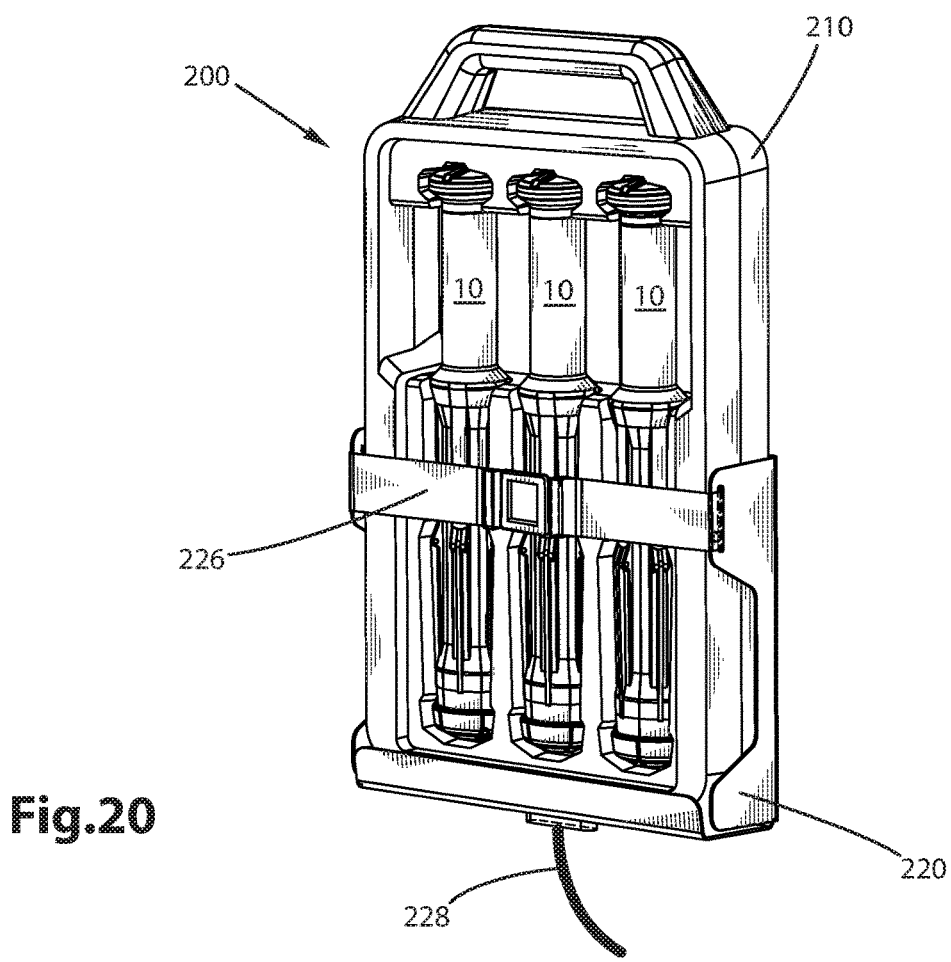
FIG. 20 is a right perspective view of the wall support of FIG. 19, with the storage box of FIG. 18 being engaged with the wall support.

In the embodiment shown, as represented in FIGS. 19 and 20, the warning assembly 200 can further comprise a wall support 220, configured to be secured to a wall portion, for instance in a vehicle. The wall support 220 comprises support portions 222 defining together a box-receiving cavity 224 dimensioned to receive, in the embodiment shown, the storage box 210.

The wall support 220 further comprises a support belt 226 to securely maintain the storage box 210 in the box-receiving cavity 224, as represented in FIG. 20.

In the embodiment shown, the wall support 220 also comprises an electric port 228 (or support electric port 228) to cooperate with a power source (not represented) to charge the warning devices 10 contained in the storage box 210. More particularly, the electric port 228 is operatively connected to the electric port 216 of the storage box 210 when the storage box 210 is located in the box-receiving cavity 224 of the wall support 220. It is thus understood that the storage box 210 forms a charging interface between the warning devices 10 and the wall support 220.

Charging Base

Figure 21:
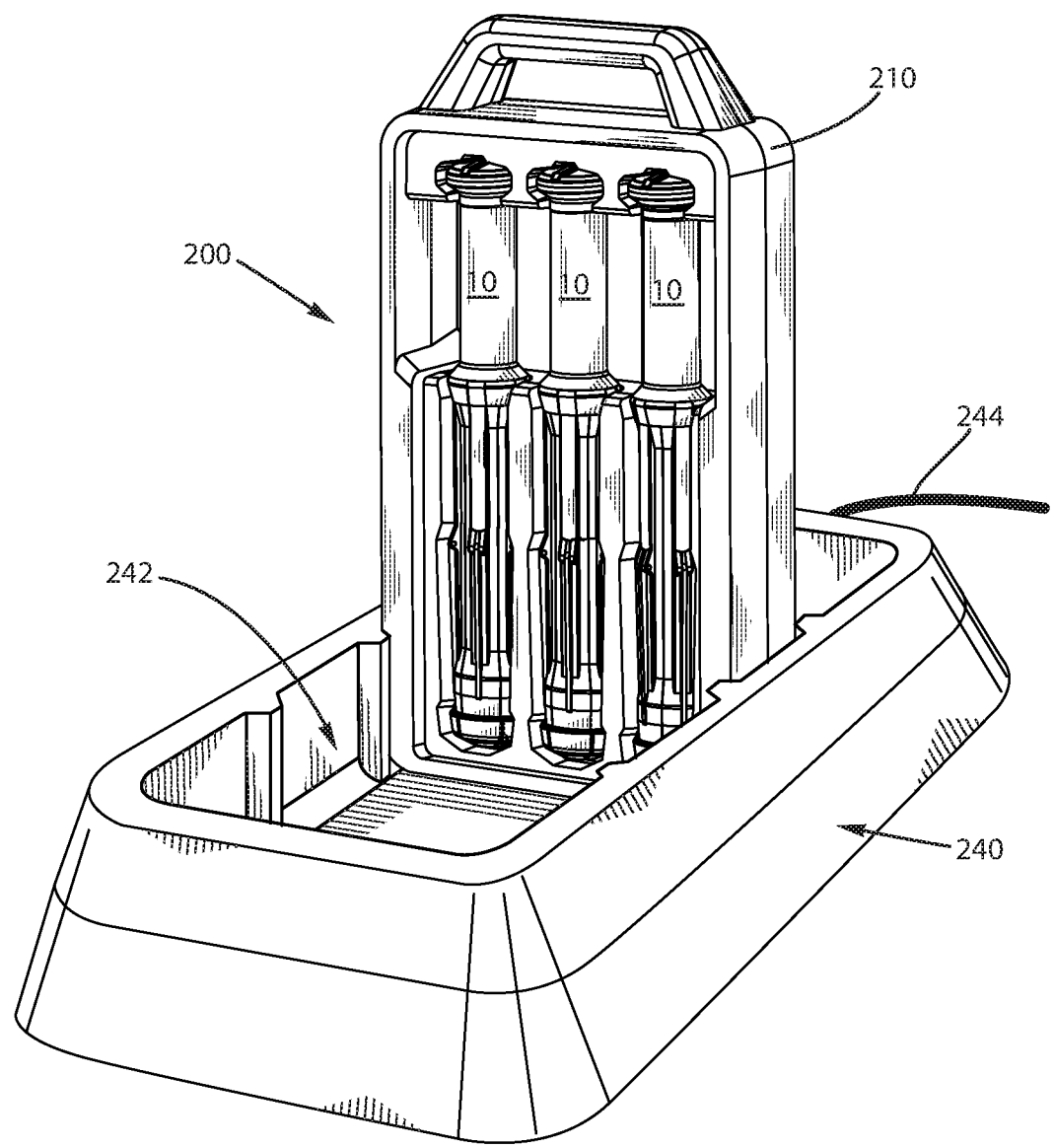
FIG. 21 is a top perspective view of a charging base in accordance with an embodiment, with the storage box of FIG. 18 being engaged with the charging base.

In the embodiment shown, as represented in FIG. 21, the warning assembly 200 can further comprise a charging base 240 having a base cavity 242 dimensioned to receive, in the embodiment shown, a plurality of storage boxes 210 (five in the embodiment shown, but could be dimensioned to receive more or less storage boxes 210).

The charging base 240 further comprises an electric connector 244 (or base electric connector 244) to electrically couple the charging base 240 to a power source, so as to charge the warning devices 10 contained in the storage box 210 received in the base cavity 242 of the charging base 240 and through the electric ports 216 of the storage boxes 210. It is thus understood that the storage box 210 forms a charging interface between the warning devices 10 and the charging base 240.

It is appreciated that the shape and the configuration of the storage box 210, the wall support 220 and the charging base 240 can vary from the embodiment shown.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A warning device comprising:
a warning body having a longitudinal axis and comprising a light-emitting assembly; and
a collapsible stand comprising:
    a handle sleeve mounted to and slidable along at least a portion of the warning body;
    a plurality of legs, each one of the plurality of legs comprising:
        a proximal end pivotably mounted to the handle sleeve; and a distal end configured to move away from the warning body in response to sliding the handle sleeve downwardly along the at least a portion of the warning body;
a rod-receiving through opening being formed in each of the plurality of legs extending along a longitudinal direction thereof;
a plurality of leg-connecting rods, each one of the plurality of leg-connecting rods connecting a corresponding one of the plurality of legs to the warning body, wherein each one of the plurality of leg-connecting rods comprises:
a proximal end portion pivotably mounted to the warning body, and
a distal end portion pivotably mounted to the corresponding one of the plurality of legs;
wherein each rod-receiving through opening is shaped and dimensioned to receive at least partially the corresponding leg-connecting rod when the collapsible stand is configured in the compacted configuration.

2. The warning device according to claim 1, wherein the handle sleeve comprises a base with the proximal end of each one of the plurality of legs being pivotably mounted to the base, wherein the warning body has a lower portion, and wherein the base of the handle sleeve further comprises a blocking assembly configured to block at least one of the plurality of legs along the lower portion of the warning body in response to sliding the handle sleeve upwardly along the at least a portion of the warning body.

3. The warning device according to claim 1, wherein the warning body comprises a lower portion with an inner cavity formed therein and the light-emitting assembly comprises a light-emitting module and at least one battery received in the inner cavity and electrically coupled to the light-emitting module.

4. The warning device according to claim 1, wherein the light-emitting assembly comprises one or more light sources and the warning device further comprises an actuator electrically coupled to the one or more light sources for a light to be automatically emitted in response to sliding the handle sleeve downwardly along the at least a portion of the warning body.

5. The warning device according to claim 1, wherein the warning body further comprises a body sleeve having an upper end, the handle sleeve being slidably mounted along at least a portion of the body sleeve, and the warning body further comprises a grabbing portion mounted to the upper end of the body sleeve.

6. The warning device according to claim 5, wherein the light-emitting assembly comprises a light-emitting module and at least one battery electrically coupled to the light-emitting module, and wherein the grabbing portion comprises an electric port couplable to a power source and configured to electrically couple the at least one battery to the power source.

7. The warning device according to claim 1, wherein the sleeve defines an inner channel shaped and dimensioned to contain the light-emitting assembly.

8. The warning device according to claim 7, wherein the light-emitting assembly is removably inserted into an upper portion of the inner channel defined in the sleeve.

9. The warning device according to claim 8, wherein the light-emitting assembly comprises a light-emitting module and a battery electrically coupled to the light-emitting module, the light-emitting module being removably inserted into the upper portion of the inner channel defined in the sleeve.

10. A warning assembly comprising:
at least one warning device according to claim 1; and
a storage box having a housing defining an inner cavity to receive the at least one warning device.

11. The warning assembly according claim 10, wherein the light-emitting assembly of the at least one warning device comprises at least one rechargeable battery and the warning body further comprises at least one electric port to electrically charge the at least one rechargeable battery, wherein the storage box further comprises a charging portion configured to be electrically coupled to the at least one electric port.

12. The warning assembly according to claim 10, further comprising a charging base, the storage box being removably mountable to the charging base in a charging configuration, the at least one warning device being electrically coupled to the charging base when configured in the charging configuration.

13. A warning device comprising:
a warning body having a longitudinal axis and comprising a light-emitting assembly and a lower end; and
a collapsible stand selectively configurable at least into:
a compacted configuration; and
a warning configuration in which the light-emitting assembly is at least partially visible;
the collapsible stand comprising:
a handle sleeve mounted to and slidable along at least a portion of the warning body; and
a plurality of legs pivotably mounted to the handle sleeve, the plurality of legs being juxtaposed against the warning body when the collapsible stand is configured in the compacted configuration to at least partially cover the warning body and the plurality of legs extending outwardly and downwardly from the warning body when the collapsible stand is configured in the warning configuration,
each one of the plurality of legs comprising a leg cap covering at least partially the lower end of the warning body when the collapsible stand is configured in the compacted configuration;
the collapsible stand being configurable between the compacted configuration and the warning configuration by sliding the handle sleeve along the at least a portion of the warning body;
wherein the leg caps of the plurality of legs form together a protection cap when the collapsible stand is configured in the compacted configuration, the protection cap covering at least partially the lower end of the warning body.

14. The warning device according to claim 13, wherein the warning body comprises a lower portion, and wherein, when the collapsible stand is configured in the compacted configuration, the plurality of legs substantially extend along and at least partially cover the lower portion of the warning body.

15. The warning device according to claim 13, wherein, when the collapsible stand is configured in the warning configuration, the plurality of legs are spaced-apart from each other and extend radially about the warning body to support the warning body in a substantially upright position.

16. The warning device according to claim 13, wherein the protection cap formed by the plurality of leg caps when the collapsible stand is configured in the compacted configuration comprises a protection ring covering an entirety of an outer periphery of the lower end of the warning body.

17. The warning device according to claim 13, wherein the collapsible stand has a width considered in a direction substantially perpendicular to the longitudinal axis, the width of the collapsible stand being equal to or greater than a length of the warning body when the collapsible stand is configured in the warning configuration.

18. The warning device according to claim 13, wherein the warning body further comprises a body sleeve having an upper end, the handle sleeve being slidably mounted along at least a portion of the body sleeve, and the warning body further comprises a grabbing portion mounted to the upper end of the body sleeve.

19. A method of emitting a warning light signal, comprising:

provinding a warning device comprising a warning body having a light-emitting assembly, and a collapsible stand configured in a compacted configuration, the collapsible stand having a handle sleeve mounted to and slidable along at least a portion of the light-emitting assembly and a plurality of legs pivotably mounted to the handle sleeve and comprising a leg cap, the leg caps of the plurality of legs forming together a protection cap covering at least partially a lower end of the warning body;

sliding the handle sleeve downwardly along the at least a portion of the light-emitting assembly for the plurality of legs to extend outwardly and downwardly from the light-emitting assembly so as to form a warning device stand and for the leg caps to uncover the lower end of the warning body; and actuating the light-emitting assembly to emit a warning light signal.

20. The method according to claim 19, wherein the light-emitting assembly is automatically actuated in response to sliding the handle sleeve downwardly along the at least a portion of the light-emitting assembly.

\* \* \* \* \*